United States Patent
Matsuura et al.

(10) Patent No.: US 8,576,942 B2
(45) Date of Patent: Nov. 5, 2013

(54) HIGH EFFICIENCY TRANSMITTER

(75) Inventors: Toru Matsuura, Kanagawa (JP); Wayne S. Lee, Menlo Park, CA (US); Tomoya Urushihara, Kanagawa (JP); Toshifumi Nakatani, Kanagawa (JP)

(73) Assignee: Panasonic Corporation, Osaka (JP)

( * ) Notice: Subject to any disclaimer, the term of this patent is extended or adjusted under 35 U.S.C. 154(b) by 200 days.

(21) Appl. No.: 13/227,264

(22) Filed: Sep. 7, 2011

(65) Prior Publication Data

US 2013/0058435 A1 Mar. 7, 2013

(51) Int. Cl.
*H04K 1/02* (2006.01)

(52) U.S. Cl.
USPC ........... 375/296; 375/295; 375/297; 375/299; 375/300; 375/316

(58) Field of Classification Search
None
See application file for complete search history.

(56) References Cited

U.S. PATENT DOCUMENTS

| | | | | |
|---|---|---|---|---|
| 7,915,969 B2 * | 3/2011 | Shimizu et al. | | 332/103 |
| 8,077,803 B2 * | 12/2011 | Hausmann et al. | | 375/302 |
| 8,385,469 B2 * | 2/2013 | Wang et al. | | 375/302 |
| 8,451,941 B2 * | 5/2013 | Zhu et al. | | 375/296 |
| 8,532,237 B2 * | 9/2013 | Shaked et al. | | 375/346 |
| 2008/0200126 A1 * | 8/2008 | Okada et al. | | 455/46 |
| 2009/0311980 A1 * | 12/2009 | Sjoland | | 455/127.3 |
| 2012/0045020 A1 * | 2/2012 | Booth et al. | | 375/298 |
| 2012/0288018 A1 * | 11/2012 | Osman et al. | | 375/259 |
| 2012/0294388 A1 * | 11/2012 | Choi et al. | | 375/308 |
| 2013/0142283 A1 * | 6/2013 | Hori | | 375/300 |

* cited by examiner

*Primary Examiner* — Hirdepal Singh

(57) ABSTRACT

A transmitter includes: a decoder for transforming an IQ signal into a linear sum of two vectors which have non-negative coefficients, respectively, which form an angle of $(\pi/4)$, and which are included in eight vectors representing directions indicated by eight angles of $(-\pi/2)$, 0, $(\pi/2)$, $\pi$, $(-3\pi/4)$, $(-\pi/4)$, $(\pi/4)$, and $(3\pi/4)$, respectively, and for outputting information upon magnitudes and angles of the two vectors; a phase generator for generating eight phase signals corresponding to phases of $(-\pi/2)$, 0, $(\pi/2)$, $\pi$, $(-3\pi/4)$, $(-\pi/4)$, $(\pi/4)$, and $(3\pi/4)$, respectively, and outputting the eight phase signals; and a selector for selecting two phase signals having phases equivalent to angles of the two vectors, from among the eight phase signals, and amplifying the two phase signals having been selected, based on the information upon the magnitudes and the angles, and outputting, as a plurality of amplification signals, the two phase signals having been amplified.

15 Claims, 22 Drawing Sheets

FIG. 11

(+ Axis)

| ANGLE | COMPENSATION VECTOR |
|---|---|
| 0 | $I_{+E0} + j Q_{+E0}$ |
| π/2 | $-Q_{+E0} + j I_{+E0}$ |
| π | $-I_{+E0} - j Q_{+E0}$ |
| -π/2 | $Q_{+E0} - j I_{+E0}$ |

(X Axis)

| ANGLE | COMPENSATION VECTOR |
|---|---|
| π/4 | $I_{XE0} + j Q_{XE0}$ |
| 3π/4 | $-Q_{XE0} + j I_{XE0}$ |
| -3π/4 | $-I_{XE0} - j Q_{XE0}$ |
| -π/4 | $Q_{XE0} - j I_{XE0}$ |

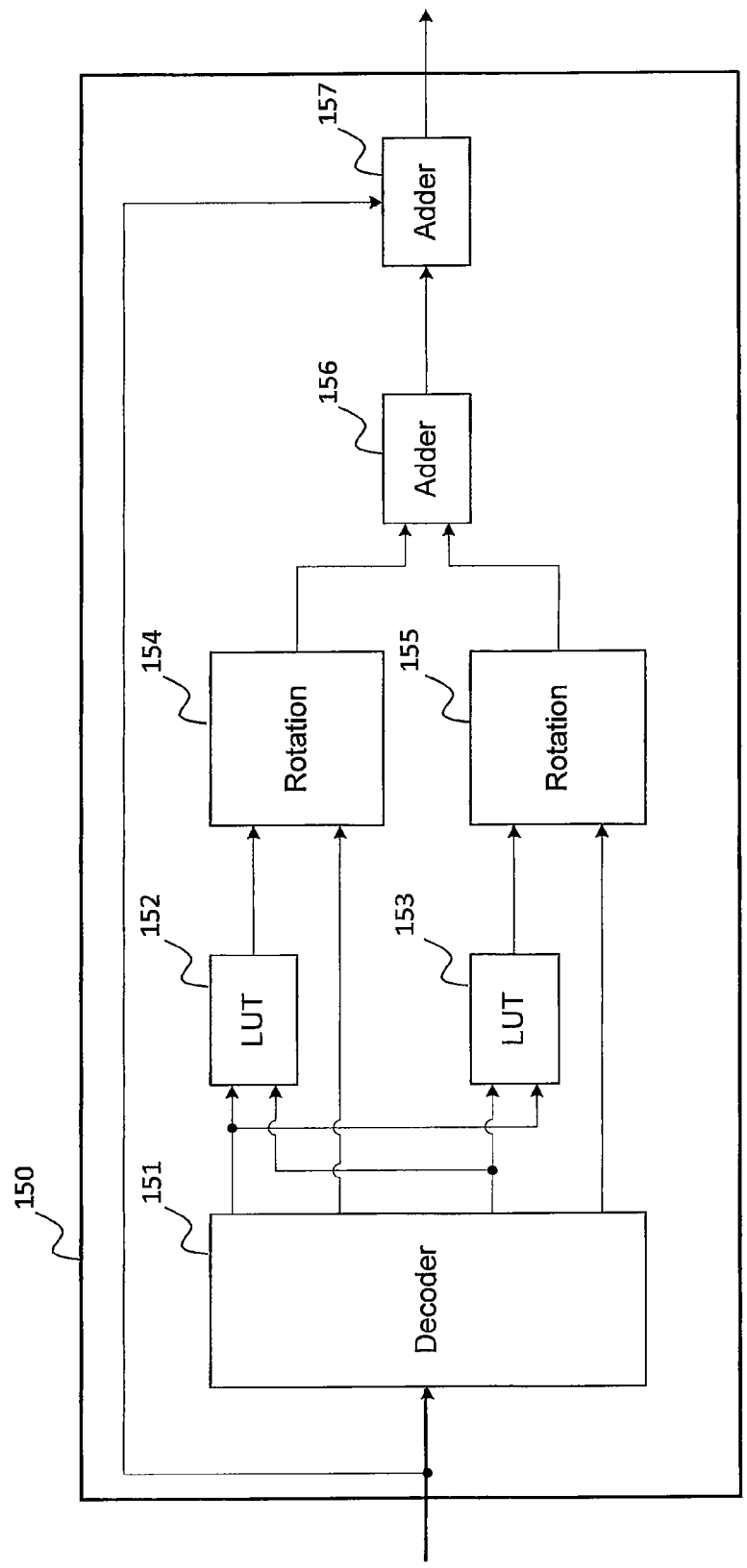
F I G. 12

F I G. 1 7
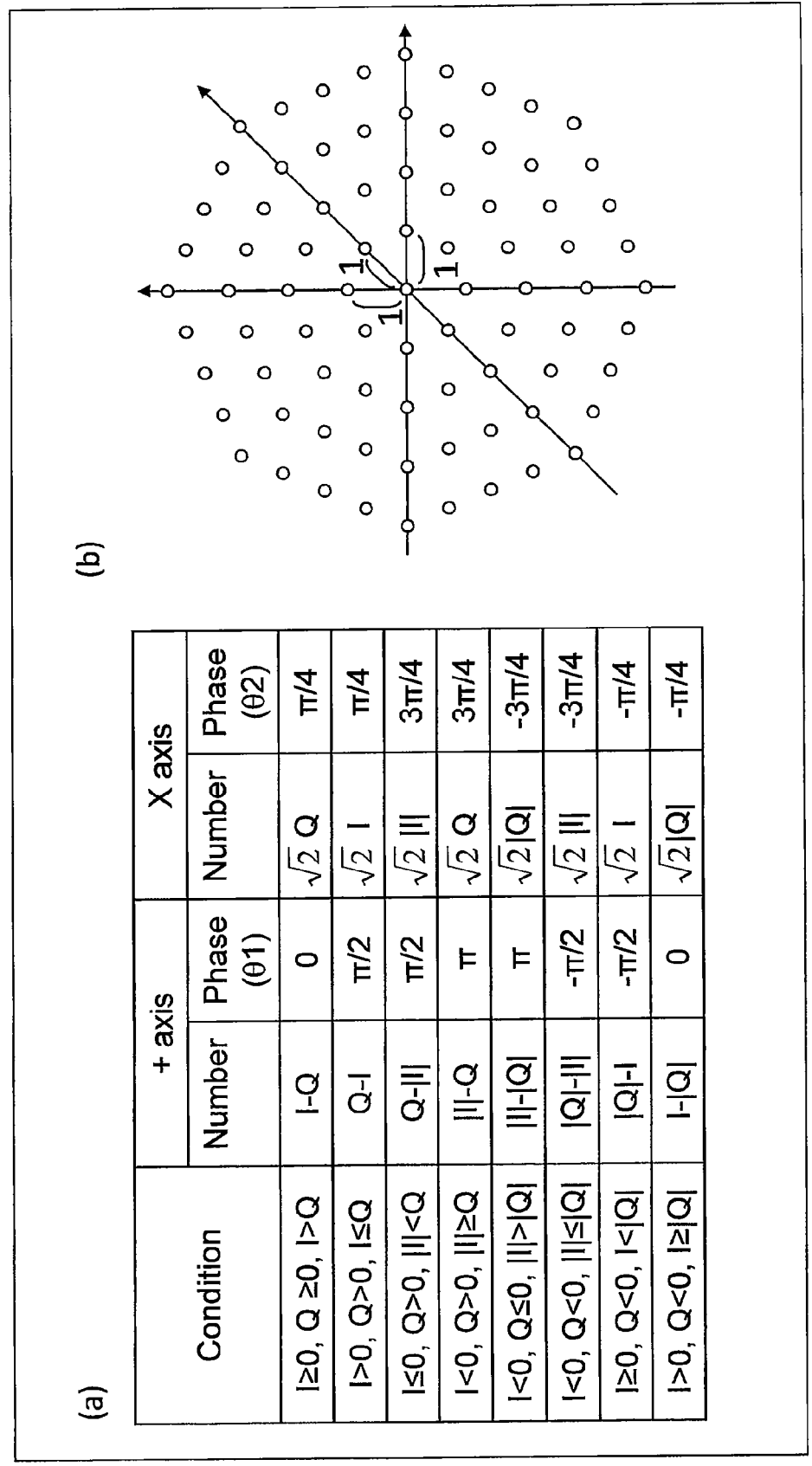

HIGH EFFICIENCY TRANSMITTER

BACKGROUND

1. Field of the Invention

The present invention relates to high efficiency transmitters, and more particularly to transmitters that allow improvement of efficiency of power amplifiers (PAs), relaxing of timing requirement, and realization of reduction in size of circuits.

2. Description of Related Art

Demand for high efficiency transmitters is increased so as to enable long time phone call communication or extension of battery duration in wireless communication devices. As high efficiency transmitters, for example, transmitters using polar modulation mode have been known to date. However, in the polar modulation mode, two modulation paths for amplitude modulation and phase modulation are connected to a PA. Therefore, there is a problem that cost is increased for timing synchronization therebetween.

SUMMARY OF THE INVENTION

Therefore, an object of the present invention is to make available a transmitter which allows improvement of efficiency of a PA, relaxing of timing requirement, and realization of reduction in size of circuits.

A first aspect of the present invention is directed to a transmitter for receiving an IQ signal, and outputting a transmission signal, and the transmitter includes: a decoder for transforming the IQ signal into a linear sum of two vectors which have non-negative coefficients, respectively, which form an angle of ($\pi/4$), and which are included in eight vectors representing directions indicated by eight angles of ($-\pi/2$), 0, ($\pi/2$), $\pi$, ($-3\pi/4$), ($-\pi/4$), ($\pi/4$), and ($3\pi/4$), respectively, and for outputting information upon magnitudes and angles of the two vectors; a phase generator for generating eight phase signals corresponding to phases of ($-\pi/2$), 0, ($\pi/2$), $\pi$, ($-3\pi/4$), ($-\pi/4$), ($\pi/4$), and ($3\pi/4$), respectively, and outputting the eight phase signals; a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal.

The selector includes: a switch and PA controller; a 2 phase selector; a plurality of switches; and a plurality of PAs that are uniquely connected to the plurality of switches, respectively. The 2 phase selector selects two phase signals having phases equivalent to angles of the two vectors, from among the eight phase signals, based on the information upon the angles of the two vectors. Based on information upon magnitudes of the two vectors, the switch and PA controller controls each of the plurality of switches so as to select either an off state or one of the two phase signals selected by the 2 phase selector, and controls, when one of the plurality of switches is operated to select one of the two phase signals, a PA, among the plurality of PAs, connected to the one of the plurality of switches, so as to amplify the one of the two phase signals by using a predetermined amplification unit.

Alternatively, the selector includes: a switch and PA controller; a 2 phase selector; a plurality of switches; and a plurality of PAs that are uniquely connected to the plurality of switches, respectively. The 2 phase selector selects two phase signals having phases equivalent to angles of the two vectors, from among the eight phase signals, based on the information upon the angles of the two vectors. Based on information upon magnitudes of the two vectors, the switch and PA controller controls each of the plurality of switches so as to select one of the two phase signals selected by the 2 phase selector, and controls whether each of the plurality of PAs is to be on or off, and controls, among the plurality of PAs, a PA that is on, so as to amplify, by using a predetermined amplification unit, one of the two phase signals selected by one of the plurality of switches, which is connected to the PA.

Alternatively, the selector includes: a switch and PA controller; a plurality of switches; and a plurality of PAs that are uniquely connected to the plurality of switches, respectively. Based on the information upon the magnitudes and the angles of the two vectors, the switch and PA controller controls each of the plurality of switches so as to select either an off state or one of the two phase signals which have phases equivalent to the angles of the two vectors, and which are among the eight phase signals, and controls, when one of the plurality of switches is operated to select one of the two phase signals, a PA, among the plurality of PAs, connected to the one of the plurality of switches, so as to amplify the one of the two phase signals by using a predetermined amplification unit.

Alternatively, the selector includes: a switch and PA controller; a plurality of switches; and a plurality of PAs that are uniquely connected to the plurality of switches, respectively. Based on the information upon the magnitudes and the angles of the two vectors, the switch and PA controller controls each of the plurality of switches so as to select, from among the eight phase signals, one of the two phase signals having phases equivalent to the angles of the two vectors, and controls whether each of the plurality of PAs is to be on or off, and controls, among the plurality of PAs, a PA that is on, so as to amplify, by using a predetermined amplification unit, one of the two phase signals selected by one of the plurality of switches, which is connected to the PA.

Alternatively, the selector includes: a switch and PA controller; a 2 phase selector; a first switch group including a plurality of switches, and a second switch group including a plurality of switches; a first PA group including a plurality of PAs that are uniquely connected to the plurality of switches, respectively, of the first switch group; and a second PA group including a plurality of PAs that are uniquely connected to the plurality of switches, respectively, of the second switch group. Based on the information upon the magnitudes and the angles of the two vectors, the switch and PA controller controls the 2 phase selector so as to select, from among the eight phase signals, two phase signals having phases equivalent to the angles of the two vectors, controls each of the plurality of switches of the first switch group so as to select either an off state or a phase signal which has a phase equivalent to one of ($-\pi/2$), 0, ($\pi/2$), and $\pi$, and which is among the two phase signals selected by the 2 phase selector, controls, when one of the plurality of switches of the first switch group is operated to select the phase signal, a PA, among the plurality of PAs of the first PA group, connected to the one of the plurality of switches of the first switch group, so as to amplify the phase signal by using a first predetermined amplification unit, controls each of the plurality of switches of the second switch group so as to select either an off state or a phase signal which has a phase equivalent to one of ($-3\pi/4$), ($-\pi/4$), ($\pi/4$), and ($3\pi/4$), and which is among the two phase signals selected by the 2 phase selector, and controls, when one of the plurality of switches of the second switch group is operated to select the phase signal, a PA, among the plurality of PAs of the second PA group, connected to the one of the plurality of switches of the second switch group, so as to amplify the phase signal by using a second predetermined amplification unit that is sqrt (2) times the first predetermined amplification unit.

The switch and PA controller may control the plurality of PAs such that an amplification unit used when any of the plurality of PAs amplifies a phase signal having one of phases of (−3π/4), (−π/4), (π/4), and (3π/4) among the eight phase signals is sqrt (2) times an amplification unit used when any of the plurality of PAs amplifies a phase signal having one of phases of (−π/2), 0, (π/2), and π among the eight phase signals.

Alternatively, the switch and PA controller may control the plurality of PAs such that amplification units used by any of the plurality of PAs for amplifying the eight phase signals are the same among the eight phase signals.

Further, the plurality of PAs are aligned in line, and the switch and PA controller sequentially selects, from among the plurality of PAs, at least one PA for amplifying one of the two phase signals selected by the 2 phase selector, in an order starting from one end of the line in which the plurality of PAs are aligned, and sequentially selects at least one PA for amplifying the other of the two phase signals, in an order starting from the other end of the line in which the plurality of PAs are aligned.

The transmitter further includes a predistorter for subjecting the IQ signal to distortion compensation, and the IQ signal having been subjected to the distortion compensation is inputted to the decoder.

The predistorter described above includes: a predistorter decoder for transforming the IQ signal into a linear sum of two vectors which have non-negative coefficients, respectively, which form an angle of (4/π), and which are included in eight vectors representing directions indicated by eight angles of (−π/2), 0, (π/2), π, (−3π/4), (−π/4), (π/4), and (3π/4), respectively, and for outputting information upon magnitudes and angles of the two vectors; a first look-up table (LUT) for outputting a first compensation vector that corresponds to a phase signal of a first predetermined angle, and that is based on a magnitude of a first vector, among the two vectors, having one of directions represented by at least (−π/2), 0, (π/2), and π; a first rotation calculator for rotating the first compensation vector, based on an angle of the first vector, in accordance with a difference between the first vector and the first predetermined angle, and outputting the first compensation vector having been rotated; a second look-up table (LUT) for outputting a second compensation vector that corresponds to a phase signal of a second predetermined angle, and that is based on a magnitude of a second vector, among the two vectors, having one of directions represented by at least (−3π/4), (−π/4), (π/4), and (3π/4); and a second rotation calculator for rotating the second compensation vector, based on an angle of the second vector, in accordance with a difference between the angle of the second vector and the second predetermined angle, and outputting the second compensation vector having been rotated; a first adder for adding an output of the first rotation calculator and an output of the second rotation calculator, and outputting a resultant output; and a second adder for adding the output of the first adder to an original IQ signal, and outputting a resultant output.

The first LUT and the second LUT may output the first compensation vector and the second compensation vector, respectively, based on the magnitudes of both of the two vectors.

Alternatively, the first LUT may output the first compensation vector in forms of an amplitude component and a phase component, and the second LUT may output the second compensation vector in forms of an amplitude component and a phase component, and the predistorter may further include a first IQ transformer and a second IQ transformer for transforming the first compensation vector and the second compensation vector into IQ signals, and inputting the IQ signals to the first rotation calculator and the second rotation calculator, respectively.

A second aspect of the present invention is directed to a transmitter for receiving an IQ signal, and outputting a transmission signal, and the transmitter includes: a decoder for transforming the IQ signal into a linear sum of two vectors which have non-negative coefficients, respectively, which form an angle of (π/2·N), and which are included in 4N vectors (N is an integer greater than or equal to 2) representing directions indicated by angles of 0, (π/2·N), 2·(π/2·N), . . . , (4N−1)(π/2·N)), respectively, and for outputting information upon magnitudes and angles of the two vectors; a phase generator for generating 4N phase signals corresponding to phases of 0, (π/2·N), 2·(π/2·N), . . . , (4N−1)(π/2·N)), respectively, and outputting the 4N phase signals; a selector for selecting two phase signals having phases equivalent to angles of the two vectors, from among the 4N phase signals, and amplifying the two phase signals having been selected, based on the information upon the magnitudes and the angels of the two vectors, and outputting, as a plurality of amplification signals, the two phase signals having been amplified; and a combiner for combining the plurality of amplification signals with each other, and outputting a combined signal as the transmission signal.

Further, the present invention is also directed to a wireless communication apparatus which includes: an antenna; an antenna switch connected to the antenna; a receiver connected to the antennal switch; and the transmitter, described above, connected to the antenna switch.

Thus, in the transmitter, improvement of efficiency of the PA, relaxing of timing requirement, and reduction in size of circuits can be realized.

The present invention can be used for transmitters and the like, and useful for, for example, transmission/reception devices including the transmitters, and communication apparatuses using the transmission/reception devices.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram illustrating an example of a compensation vector according to the second embodiment of the present invention;

FIG. 12 is a diagram illustrating a configuration of a pre-distorter according to the second embodiment of the present invention;

FIG. 17 is a diagram illustrating examples of a signal pattern and signal processing according to a third embodiment of the present invention;

DETAILED DESCRIPTION OF THE PREFERRED EMBODIMENTS (First Embodiment)

Figure 1:
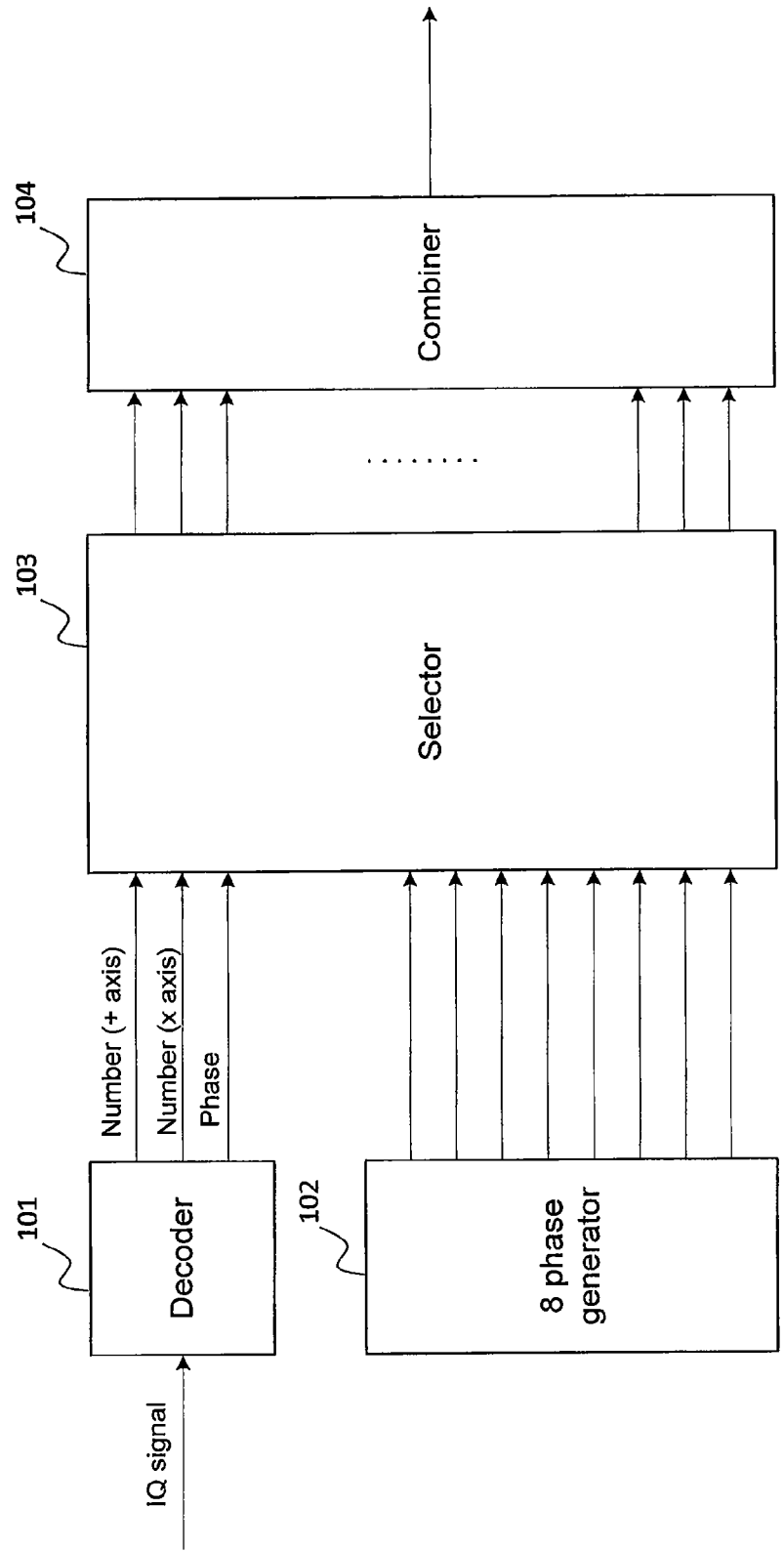
FIG. 1 is a diagram illustrating a configuration of a transmitter according to a first embodiment of the present invention.

FIG. 1 is a diagram illustrating a configuration of a transmitter 100 according to a first embodiment of the present invention. The transmitter 100 includes a decoder 101, a phase generator 102, a selector 103, and a combiner 104.

The decoder 101 receives an IQ signal which is a baseband signal, and separates a vector represented by the IQ signal into two vectors, according to a value of the IQ signal. Namely, the IQ plane is classified into regions every π/4 (rad) relative to an origin, and the decoder 101 transforms the vector represented by the IQ signal so as to be represented in another form as described below, according to a region, among the regions, which the IQ signal belongs to.

$$I + jQ = \begin{cases} (I-Q)\exp(j0) + \sqrt{2}Q\exp\left(j\frac{\pi}{4}\right), & \text{if } I \geq 0, Q \geq 0, I > Q \\ (Q-I)\exp\left(j\frac{\pi}{2}\right) + \sqrt{2}I\exp\left(j\frac{\pi}{4}\right), & \text{if } I > 0, Q > 0, I \leq Q \\ (Q-|I|)\exp\left(j\frac{\pi}{2}\right) + \sqrt{2}|I|\exp\left(j\frac{3\pi}{4}\right), & \text{if } I \leq 0, Q > 0, |I| < Q \\ (|I|-Q)\exp(j\pi) + \sqrt{2}Q\exp\left(j\frac{3\pi}{4}\right), & \text{if } I < 0, Q > 0, |I| \geq Q \\ (|I|-|Q|)\exp(j\pi) + \sqrt{2}|Q|\exp\left(-j\frac{3\pi}{4}\right), & \text{if } I < 0, Q \leq 0, |I| > |Q| \\ (|Q|-|I|)\exp\left(-j\frac{\pi}{2}\right) + \sqrt{2}|I|\exp\left(-j\frac{3\pi}{4}\right), & \text{if } I < 0, Q < 0, |I| \leq |Q| \\ (|Q|-I)\exp\left(-j\frac{\pi}{2}\right) + \sqrt{2}I\exp\left(-j\frac{\pi}{4}\right), & \text{if } I \geq 0, Q < 0, I < |Q| \\ (I-|Q|)\exp(j0) + \sqrt{2}|Q|\exp\left(-j\frac{\pi}{4}\right), & \text{if } I > 0, Q < 0, I \geq |Q| \end{cases}$$

(Equation 1)

The first term of the right-hand side in (equation 1) is associated with a (+ axis) vector, and the second term thereof is associated with an (X axis) vector. According to (equation 1), the vector of the IQ signal is represented as a linear sum of two vectors which have non-negative coefficients, respectively, which form an angle of (π/4), for any classified region.

The (+ axis) is a vector representing, on the IQ plane, any one of directions indicated by (−π/2), 0, (π/2), and π, and the (X axis) is a vector representing any one of directions indicated by (−3π/4), (−π/4), (π/4), and (3π/4).

Figure 2:
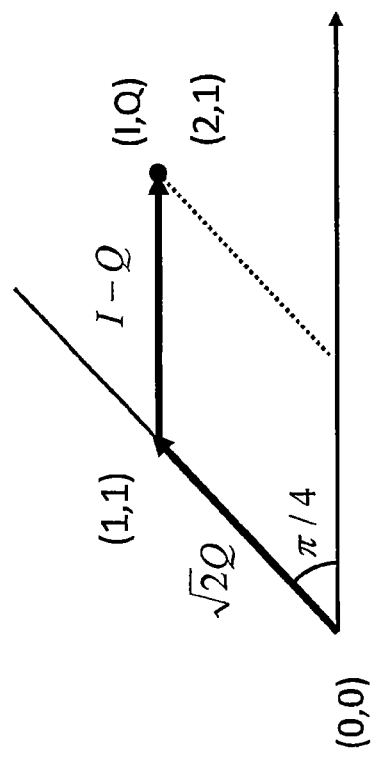
FIG. 2 is a diagram illustrating examples of a signal pattern and signal processing according to the first embodiment of the present invention.

For example, in FIG. 2, (I, Q)=(2, 1) is separated into a vector representing a magnitude of 1 and a direction indicated by an angle of 0, and a vector representing a magnitude of sqrt (2) (the square root of 2), and a direction indicated by (π/4).

Figure 3:
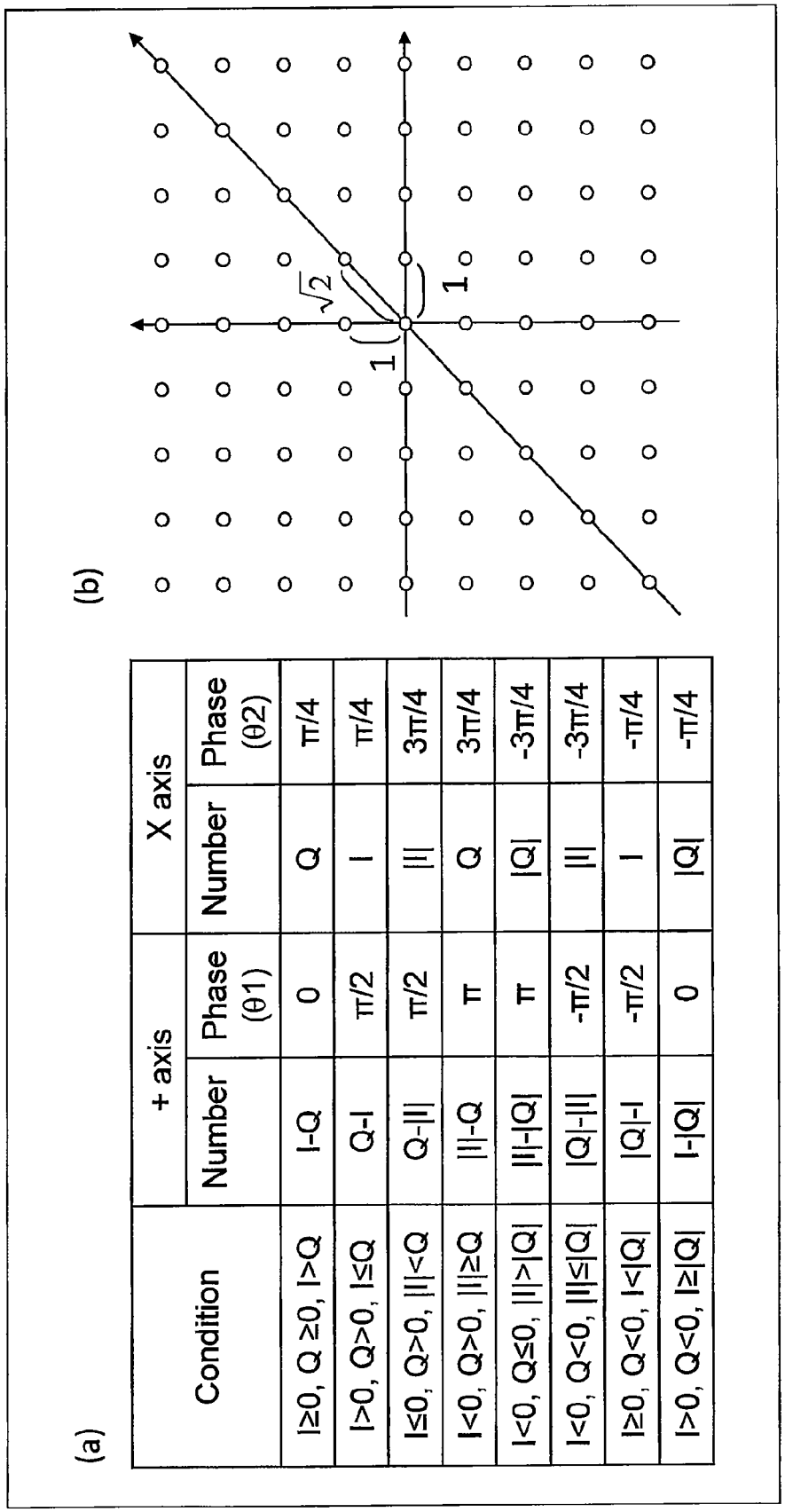
FIG. 3 is a diagram illustrating an example of signal processing according to the first embodiment of the present invention.

The decoder 101 outputs, based on (equation 1), a Number and a phase signal of the (+ axis), which is information upon a magnitude and a phase of the (+ axis), and a Number and a phase signal of the (X axis), which is information upon a magnitude and a phase of the (X Axis). Correspondence among values of an I signal, values of a Q signal, and output signals thereof is indicated in (a) of FIG. 3. Further, positions of symbols which are represented on the IQ plane by the IQ signals according to the present embodiment are indicated in (b) of FIG. 3.

The phase generator 102 outputs eight phase signals corresponding to phases of 0, π/4, π/2, 3π/4, π, −3π/4, −π/2, and −π/4, respectively. The phase generator 102 is configured so as to include a PLL. When frequency control needs to be performed, a frequency control command may be inputted to the phase generator 102.

The selector 103 selects, based on the phase signals of the (+ axis) and the (X axis) included in an output signal from the decoder 101, signals having the same phases as phases represented by these phase signals, from among the eight phase signals outputted by the phase generator, and amplifies the selected signals based on the Number of the (+ axis) and the Number of the (X axis) included in the output signal from the decoder 101, to output resultant signals.

The combiner 104 combines the signals outputted from the selector 103 with each other, to generate a transmission signal.

Figure 4:
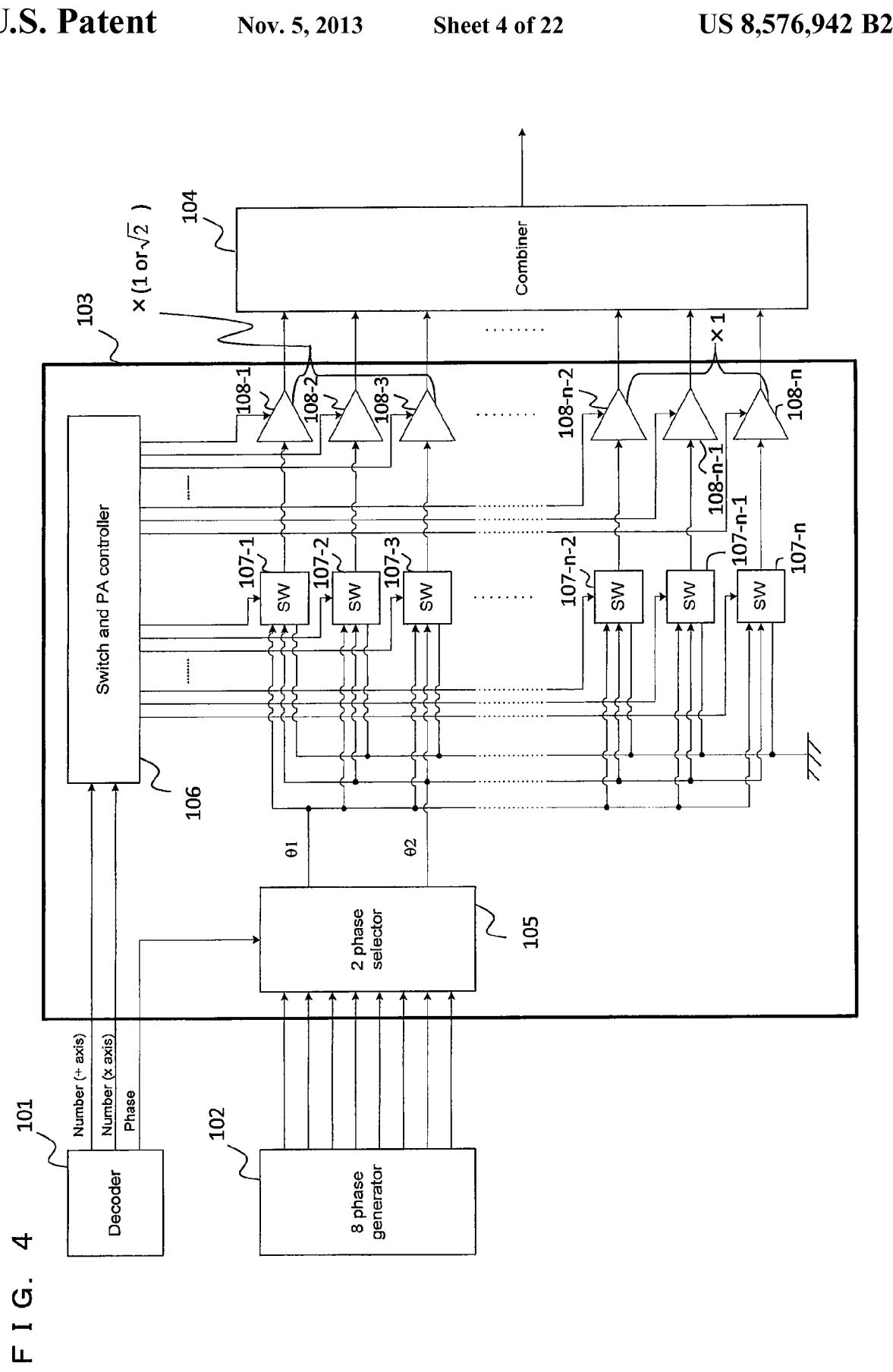
FIG. 4 is a diagram illustrating a configuration of a selector according to the first embodiment of the present invention.

FIG. 4 is a diagram illustrating in detail an exemplary configuration of the selector 103. In FIG. 4, the selector 103 includes a 2 phase selector 105, a switch and PA controller 106, a plurality of SWs 107 (107-1, 107-2, ..., 107-n), and a plurality of PAs 108 (PAs 108-1, 108-2, ..., 108-n).

To the 2 phase selector 105, the eight phase signals are inputted from the phase generator 102, and the two phase signals are inputted from the decoder 101. The 2 phase selector 105 selects two phases (θ1, θ2) from among the eight phase signals, based on the two phase signals.

To the switch and PA controller 106, signals representing the Number (+ axis) and the Number (X axis) are inputted in units of bits from the decoder 101. The switch and PA controller 106 controls the plurality of SWs 107 and the plurality of PAs 108, based on the Number (+ axis) and the Number (X axis) having been inputted.

Each of the plurality of SWs 107 is switched so as to be put in a state in which one of a signal of θ1 or a signal of θ2 is selected, or an off state. Further, the plurality of SWs 107 are uniquely connected to the plurality of PAs 108, respectively.

For example, when a signal representing the Number (+ axis) indicates two, the switch and PA controller 106 is operable to output the phase signal of θ1 to the SWs 107-n-1 and 107-n, and when a signal representing the Number (X axis) indicates two, the switch and PA controller 106 is operable to output the phase signal of θ2 to the SWs 107-1 and 107-2, and the remaining SWs 107-3-107-n-2 are each put in an off state.

Further, to each of the PAs 108, a bit signal representing one of the Numbers is inputted from the switch and PA controller 106. To each of the PAs 108, each of the signals of θ1 and θ2 is inputted through the switch connected thereto, and each of the PAs 108 amplifies each of the signals according to a predetermined amplification factor, based on the inputted bit signal, and outputs a resultant signal as an output of the selector 103.

A ratio, in an amplification unit of the amplification factor used by each of the PAs 108 for the inputted phase signal, between a phase signal of the (+ axis), i.e., $(-\pi/2)$, 0, or $(\pi/2)$, and a phase signal of the (X axis), i.e., $(-3\pi/4)$, $(-\pi/4)$, $(\pi/4)$, or $(3\pi/4)$, is approximately 1:sqrt (2). This is because a value obtained by multiplying the Number of the (X axis) by sqrt (2) represents a magnitude of a signal to be generated.

Further, in accordance therewith, a ratio between the necessary number of amplifiers for amplifying the phase signal of the (+ axis), and the necessary number of amplifiers for amplifying the phase signal of the (X axis) is approximately sqrt (2):1 when the IQ signal- represents a maximal amplitude.

Therefore, some of the plurality of PAs 108 operate according to amplification factors for which the amplification units are 1 and sqrt (2), and the remaining PAs 108 operate according to an amplification factor for which the amplification unit is 1.

An operation of the selector 103 performed when, for example, the IQ signal (I, Q)=(2, 1) is satisfied as shown in FIG. 2, will be described.

Firstly, I≥0, Q≥0, and I>Q indicated in the first line in FIG. 3(a) is satisfied, and the Number (+ axis) is 1, θ1 is 0, the Number (X axis) is 1, and θ2 is π/4.

Next, θ1 and θ2 are inputted to the 2 phase selector 105 so as to satisfy θ1=0 and θ2=π/4, and the 2 phase selector 105 selects two phases satisfying (θ1, θ2)=(0, π/4) from among phases represented by the eight phase signals.

Next, the Numbers are inputted to the switch and PA controller 106 so as to satisfy the Number (+ axis)=1 and the Number (X axis)=1.

It is previously specified that the switch and PA controller 106 selects the SW 107 in an ascending order starting from the SW 107-1 side for the Number (X axis), and selects the SW 107 in a descending order starting from the SW 107-n side for the Number (+ axis), for example. Therefore, the switch and PA controller 106 puts the SW 107-n in a state where the single of θ1 is selected, based on the Number (X axis)=1, puts the SW 107-1 in a state where the signal of θ2 is selected, based on the Number (+ axis)=1, and puts the remaining SWs 107-2, ..., 107-n-1 in an off state.

Next, the switch and PA controller 106 inputs a bit signal representing 1, to the PA 108-1 corresponding to the SW 107-1 based on the Number (X axis)=1, and inputs a bit signal representing 1, to the PA 108-n corresponding to the SW 107-n, based on the Number (+ axis)=1.

Since the bit signal based on the Number (X axis) is inputted to the PA 108-1, the amplification unit indicates a value obtained by multiplying the Number (X axis) by sqrt (2). Since the bit signal based on the Number (+ axis) is inputted to the PA 108-n, the amplification unit indicates 1.

Figure 5:
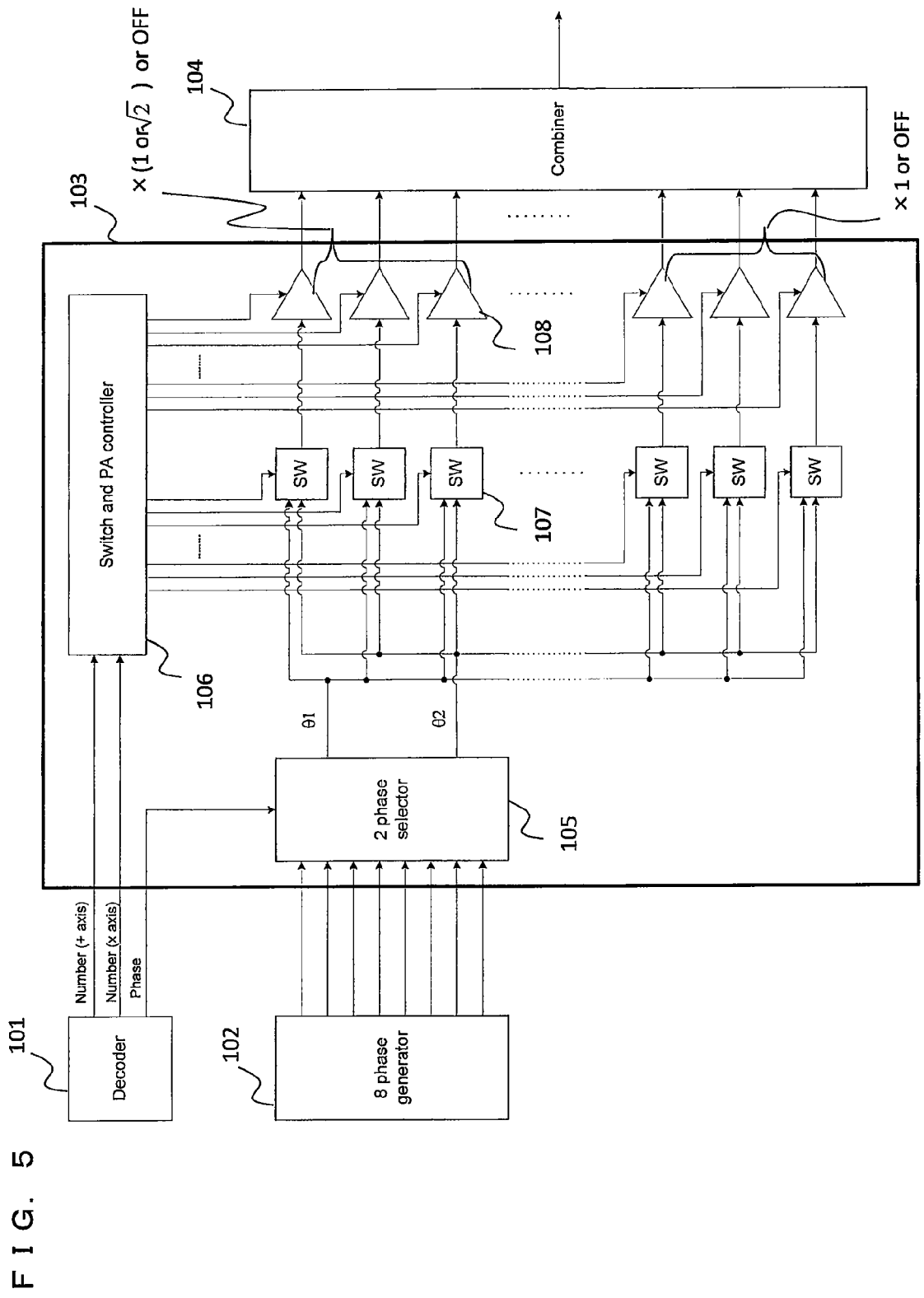
FIG. 5 is a diagram illustrating a configuration of a selector according to the first embodiment of the present invention.

FIG. 5 shows in detail another exemplary configuration of the selector 103. In FIG. 5, the PAs 108 can be put in an off state without putting the SWs 107 shown in FIG. 4 in the off state.

Figure 6:
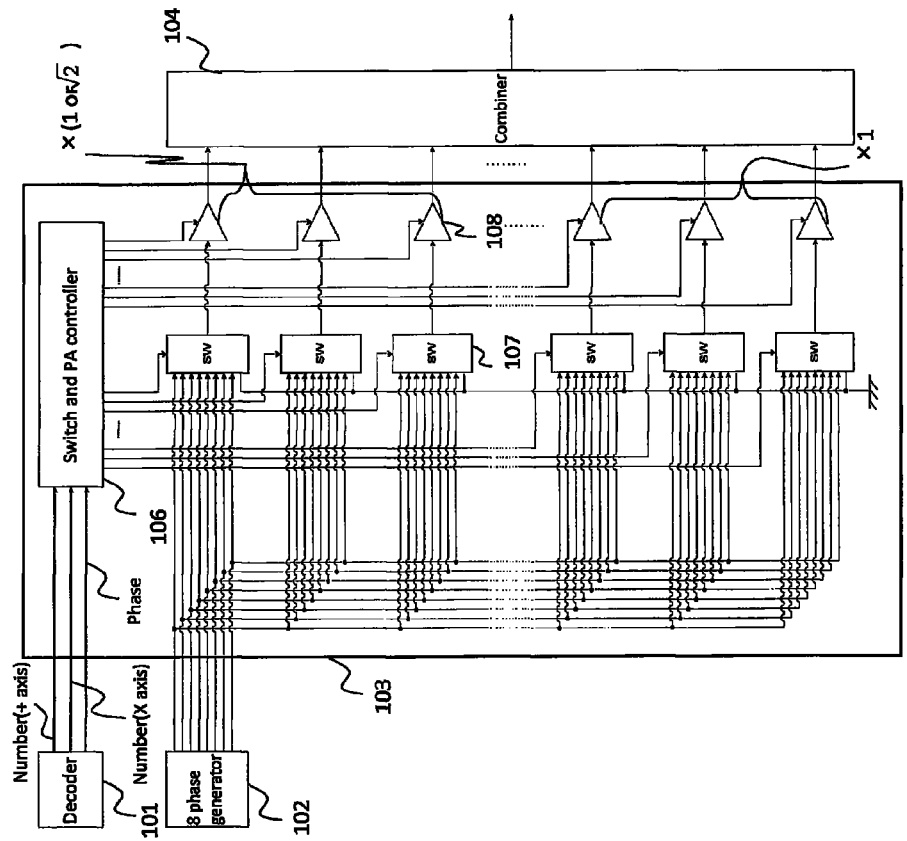
FIG. 6 is a diagram illustrating a configuration of a selector according to the first embodiment of the present invention.

FIG. 6 shows in detail still another exemplary configuration of the selector 103. In FIG. 6, the 2 phase selector 105 shown in FIG. 4 is not provided, and the eight phase signals are inputted to each of the SWs 107, and the switch and PA controller 106 controls each of the SWs 107 so as to select, based on the phase signals of the (+ axis) and the (X axis) included in an output signal from the decoder, signals having the same phases as phases represented by these phase signals.

Figure 7:
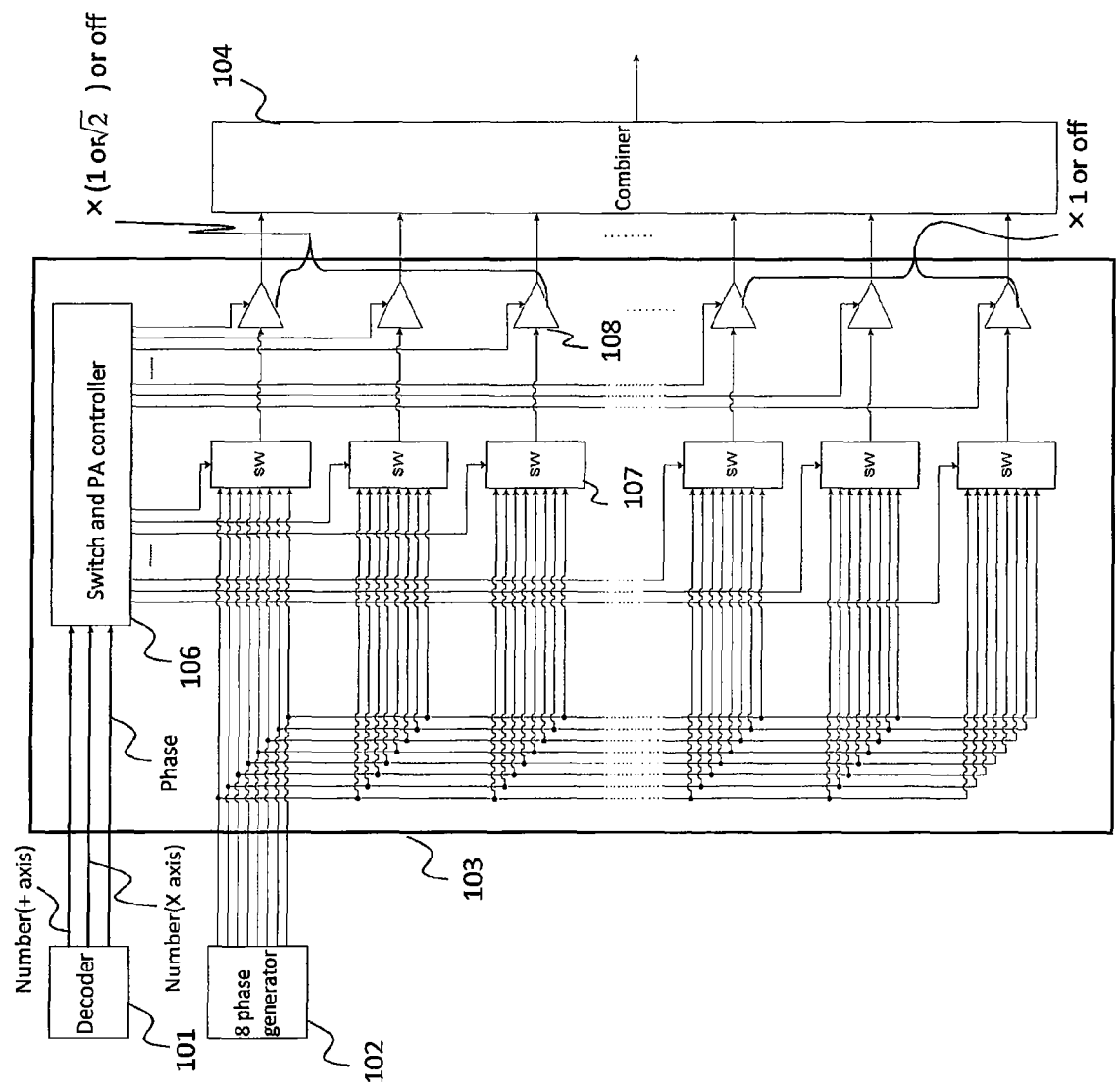
FIG. 7 is a diagram illustrating a configuration of a selector according to the first embodiment of the present invention.

FIG. 7 shows in detail still another exemplary configuration of the selector 103. In FIG. 7, each of the PAs 108 can be put in an off state without putting the SWs 107 shown in FIG. 6 in the off state.

In the examples shown in FIG. 4 to FIG. 6, the allocation is preferably performed such that the PAs 108 for a PA group for amplifying the phase signals of the (+ axis) are selected in an order starting from one end side of an alignment of the plurality of PAs 108, and the PAs 108 for a PA group for amplifying the phase signals of the (X axis) are selected in an order starting from the other end side of the alignment of the plurality of PAs 108. Thus, a distance between the PAs 108 belonging to different groups can be increased, thereby enabling improvement of isolation and improvement of a quality of a transmission signal.

In the examples shown in FIGS. 4 to 6, the number of the PAs 108 can be reduced, and, in the example shown in FIG. 7, control of the SWs 107 and the PAs 108 can be simplified, so that power consumption can be reduced in each case. Designing may be performed in consideration of sizes, power consumption, or cost, as necessary. As the PAs 108, class B, class C, class D, and class E amplifiers are used, and particularly class D amplifier and class E amplifier are preferable.

Figure 8:
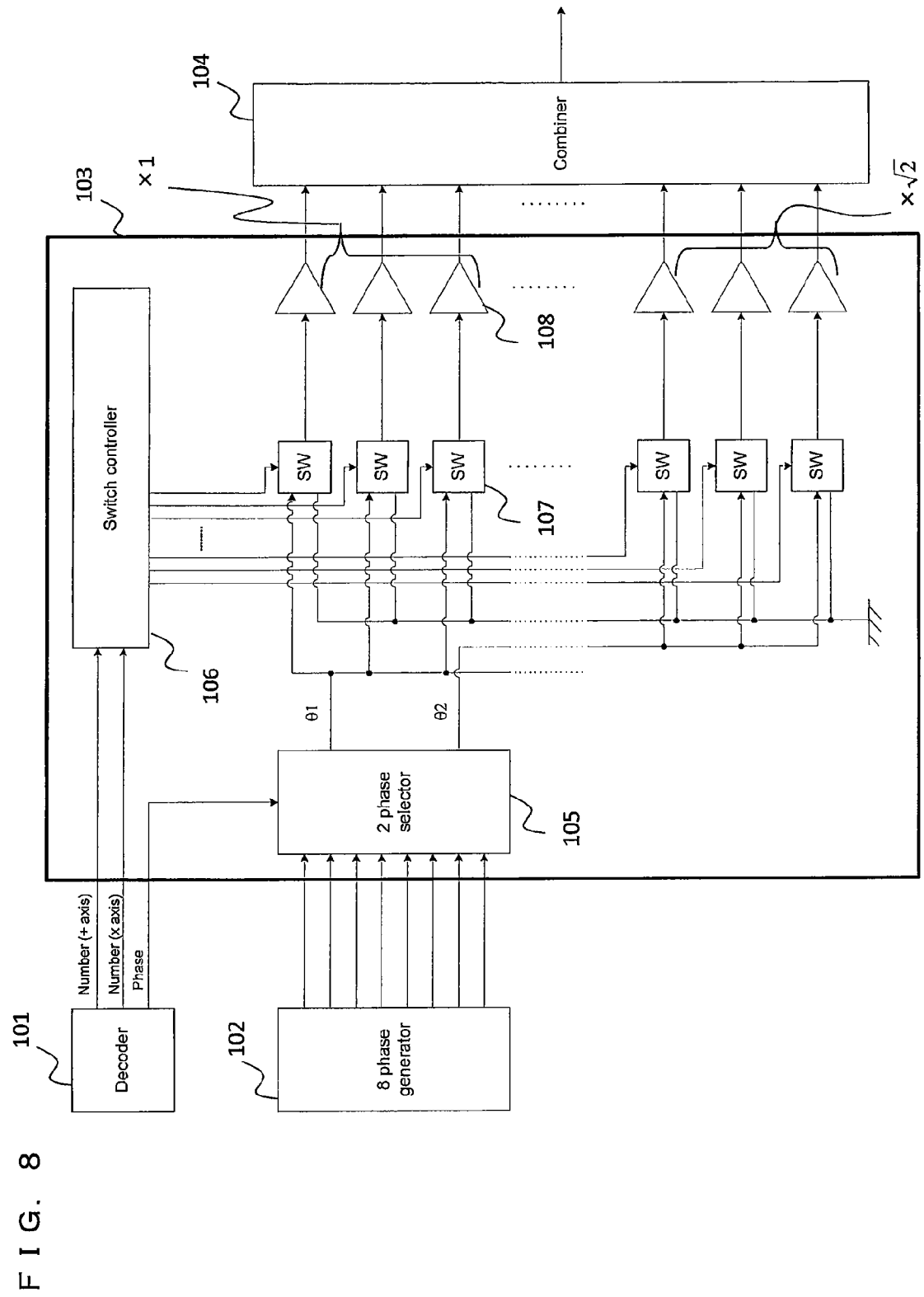
FIG. 8 is a diagram illustrating a configuration of a selector according to the first embodiment of the present invention.

FIG. 8 shows in detail still another exemplary configuration of the selector 103. In FIG. 8, the phase signal inputted to each of the SWs 107 shown in FIG. 4 is one of a signal of θ1 or a signal of θ2, and some of the plurality of PAs 108 amplify the phase signals of the (+ Axis) by using the amplification factor having an amplification unit of 1, and the remaining portion of the plurality of PAs 108 amplifies the phase signals of the (X Axis) by using the amplification factor having an amplification unit of sqrt (2).

(Second Embodiment)

Figure 9:
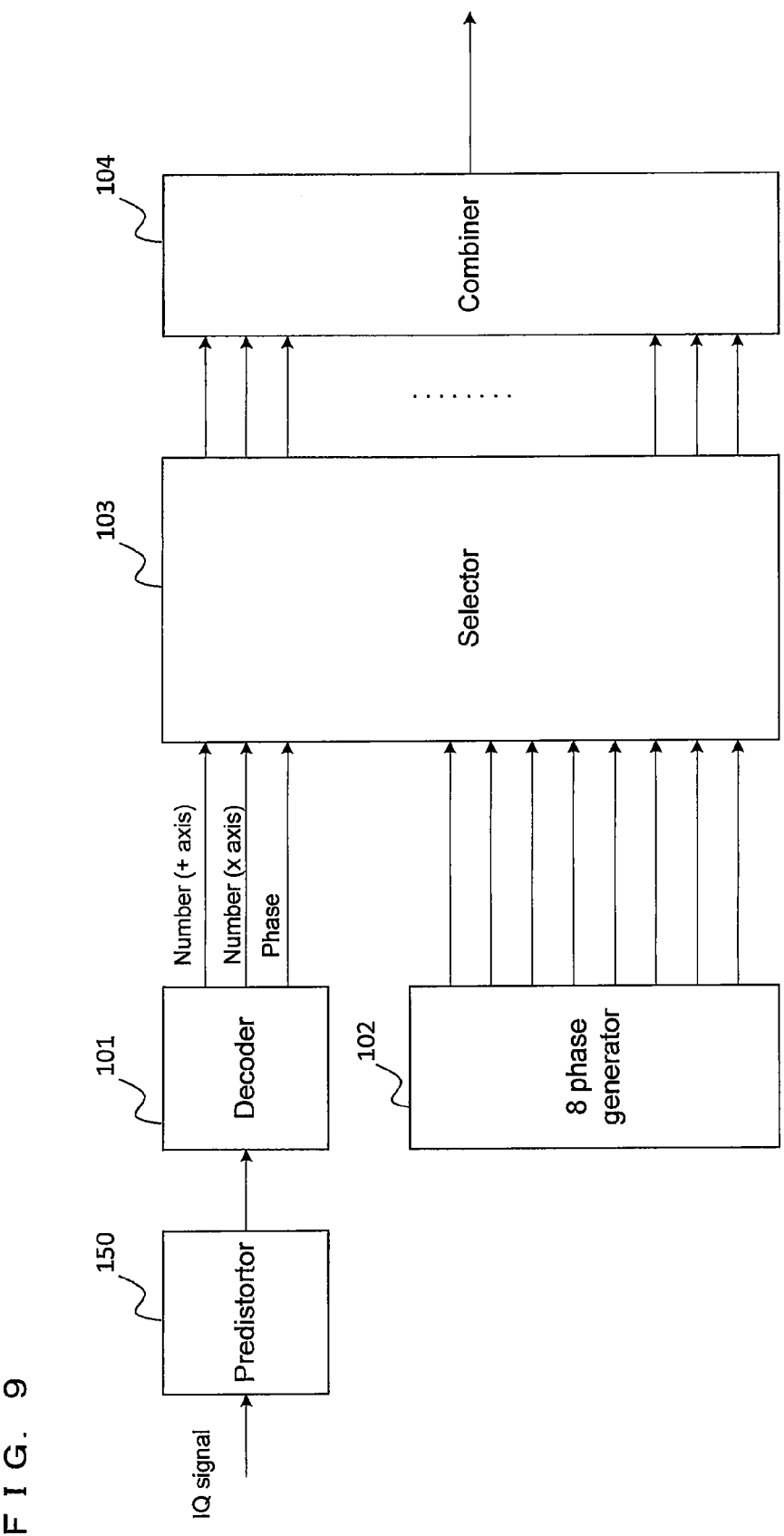
FIG. 9 is a diagram illustrating a configuration of a transmitter according to a second embodiment of the present invention.

FIG. 9 is a diagram illustrating a configuration of a transmitter 200 according to a second embodiment of the present invention. The transmitter 200 has a predistorter 150 connected preceding the decoder 101 in the configuration of the transmitter 100 of the first embodiment. The IQ signal is subjected to distortion compensation by the predistorter 150, and is thereafter inputted to the decoder 101.

When variation in characteristic among the PAs 108 occurs, a transmission signal is distorted, thereby deteriorating quality. Therefore, the predistorter 150 adds, to the IQ signal, a compensation vector for compensating for an error vector representing distortion characteristics of the PAs 108, thereby compensating for the distortion.

Figure 10:
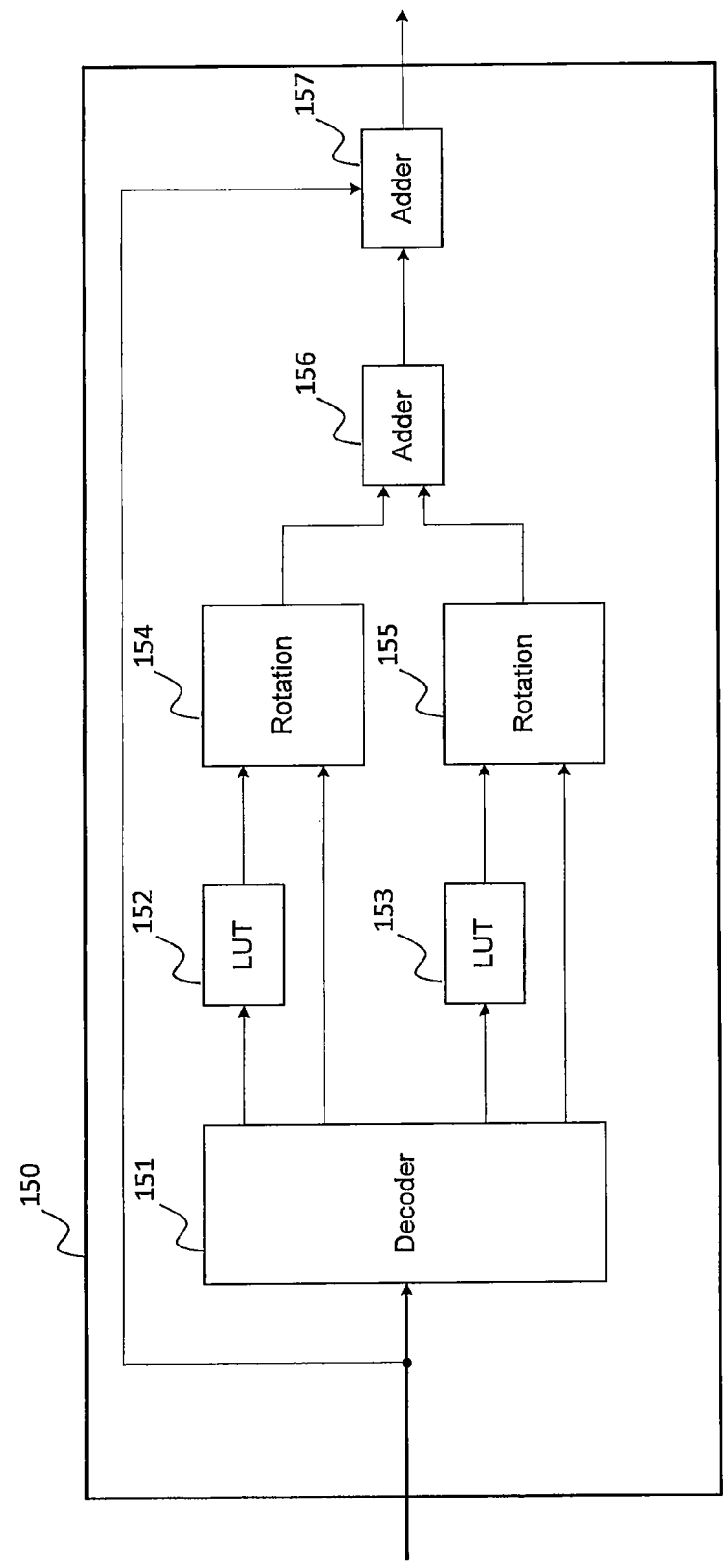
FIG. 10 is a diagram illustrating a configuration of a pre-distorter according to the second embodiment of the present invention.

FIG. 10 shows in detail an exemplary configuration of the predistorter 150. The predistorter 150 is configured so as to include a predistorter decoder 151, look-up tables (LUTs) 152 and 153, rotation calculators 154 and 155, and adders 156 and 157.

The IQ signal inputted to the predistorter 150 is transformed into a Number and a phase signal of the (+ axis), and a Number and a phase signal of the (X axis), based on (equation 1), by means of the predistorter decoder 151.

The LUT 152 is operable to output, based on the Number of the (+ axis), a compensation vector $I_{+E0}+jQ_{+E0}$ corresponding thereto. The compensation vector $I_{+E0}+jQ_{+E0}$ corresponds to a phase of 0.

The compensation vector for another angle is obtained by rotating the compensation vector $I_{+E0}+jQ_{+E0}$ according to the other angle. The rotation calculator 154 rotates the compensation vector $I_{+E0}+jQ_{+E0}$ based on the phase signal of the (+ axis), to obtain the compensation vector corresponding to the phase signal of the (+ axis).

Similarly, the LUT 153 is operable to output, based on the Number of the (X Axis), a compensation vector $I_{XE0}+jQ_{XE0}$ corresponding to the phase signal of the (X Axis). The compensation vector $I_{XE0}+jQ_{XE0}$ corresponds to a phase of 4/π.

The compensation vector for another angle is obtained by rotating the compensation vector $I_{XE0}+jQ_{XE0}$ according to an angle obtained by subtracting π/4 from the other angle.

The rotation calculator 155 rotates the compensation vector $I_{XE0}+jQ_{XE0}$ based on the phase signal of the (X axis), to obtain the compensation vector corresponding to the phase signal of the (X axis).

The compensation vectors obtained by the rotation calculators 154 and 155 are indicated for the (+ axis) and the (X axis), respectively, in FIG. 11. When the LUTs 152 and 153 store, for example, the compensation vectors for 0 and (π/4), respectively, without storing the compensation vectors for all the values of the phase signals, sizes of the LUTs 152 and 153 can be reduced, and cost reduction is enabled.

The LUTs 152 and 153 are operable to output the compensation vectors for phase signals of 0 and (π/4), respectively. However, the compensation vectors for other phase signals may be outputted.

The adder 156 adds the two compensation vectors outputted from the LUTs 152 and 153. Further, the adder 157 adds the compensation vector obtained by the addition in the adder 156 to the original IQ signal. A signal obtained by the addition in the adder 157 is inputted to the decoder 101 as an output from the predistorter 150.

FIG. 12 is a diagram illustrating in detail another exemplary configuration of the predistorter 150. The predistorter 150 shown in FIG. 12 is different from the predistorter 150 shown in FIG. 10 in that, in the predistorter 150 shown in FIG. 12, each of the LUTs 152 and 153 is operable to output, based on both the Number of the (+ axis) and the Number of the (X axis), a compensation vector corresponding to the Numbers. In a case where the PAs 108 represent a correlation among amplifiers, and distortion characteristic depends on both the Number of the (+ axis) and the Number of the (X axis), this configuration is preferable.

Figure 13:
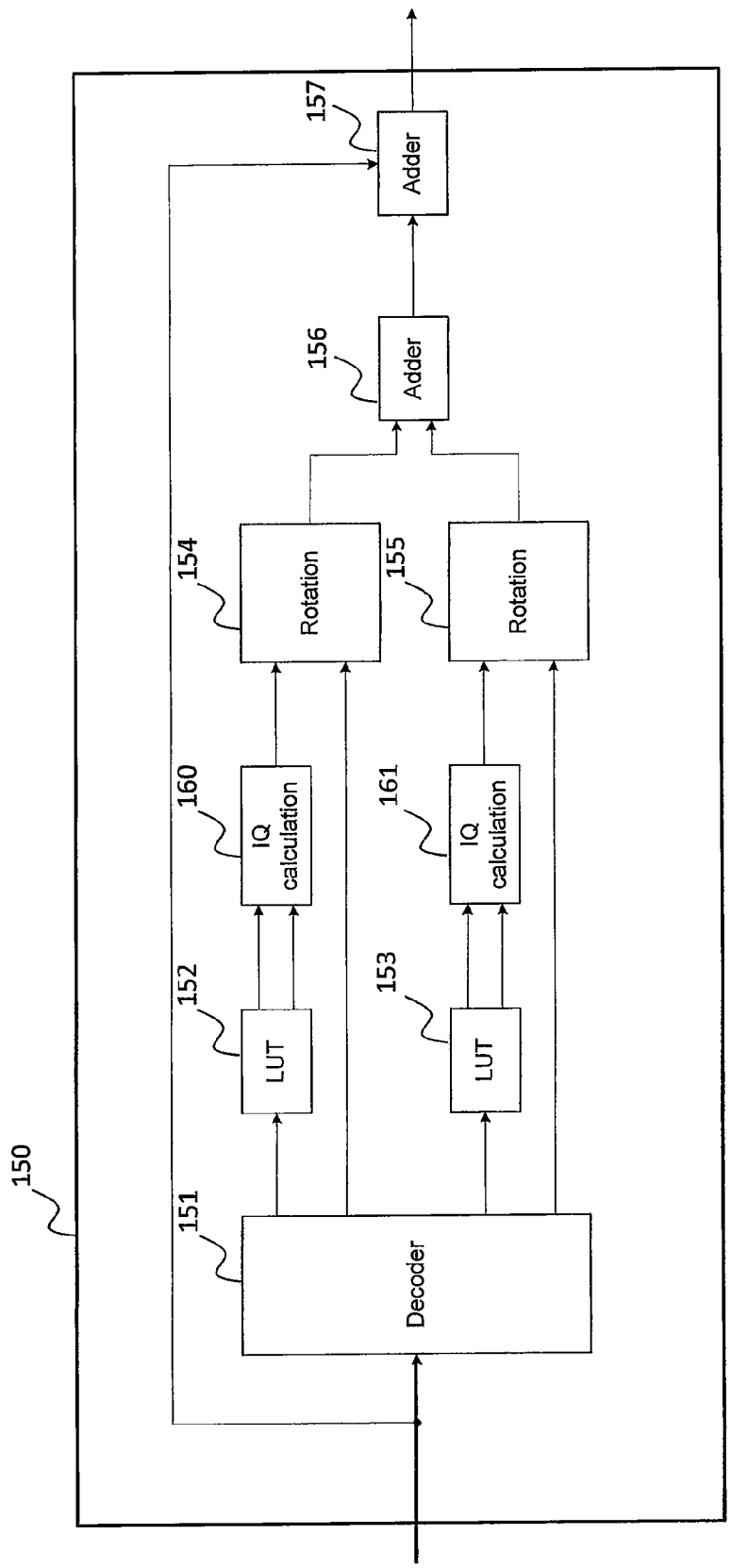
FIG. 13 is a diagram illustrating a configuration of a pre-distorter according to the second embodiment of the present invention.

FIG. 13 is a diagram illustrating in detail another exemplary configuration of the predistorter 150. The predistorter 150 shown in FIG. 13 is different from the predistorter 150 shown in FIG. 10 in that, in the predistorter 150 shown in FIG. 13, each of the LUTs 152 and 153 is operable to output the compensation vector in forms of an amplitude component and a phase component, and IQ calculators 160 and 161 are provided for transforming the compensation vectors so as to be represented in forms of IQ components, respectively.

In the present embodiment, the predistorter 150 is operable to reduce distortion of a transmission signal, thereby improving quality of the transmission signal.

Figure 14:
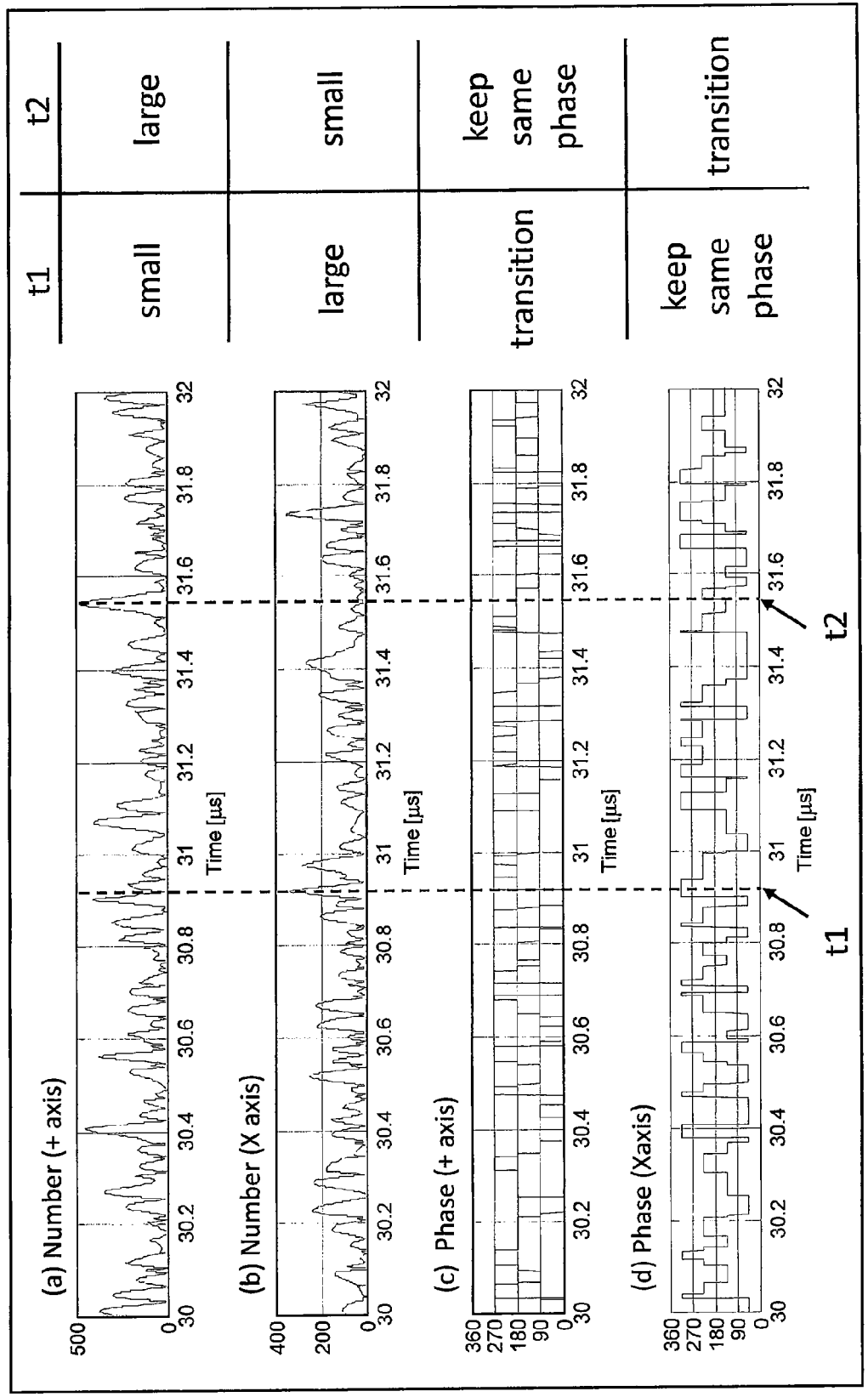
FIG. 14 is a diagram illustrating an example of signal processing of the transmitter according to the present invention.

FIG. 14 shows an example of signal processing. In (a) and (b) of FIG. 14, the horizontal axis represents a time, and the vertical axis represents the Number of the (+ axis) and the Number of the (X axis), respectively, and variation of each of the Numbers plotted against the time is indicated. Further, in (c) and (d) of FIG. 14, the horizontal axis represents a time, and the vertical axis represents phases indicated by the phase signals of the (+ axis) and the (X axis), respectively, and variation of each of the phases plotted against the time is indicated.

Further, a value of the Number, or a value of the phase signal, or evaluation of varying state at times t1 and t2 in (a) to (d) is indicated on the right end portion in FIG. 14. At time t1, the Number of the (+ axis) is small, and the phase of the (+ axis) fluctuates. Further, at time t2, the Number of the (X axis) is small, and the phase of the (X axis) fluctuates. Fluctuations of the phases of the (+ axis) and the (+ axis) lead to reduction of the Numbers.

Figure 15:
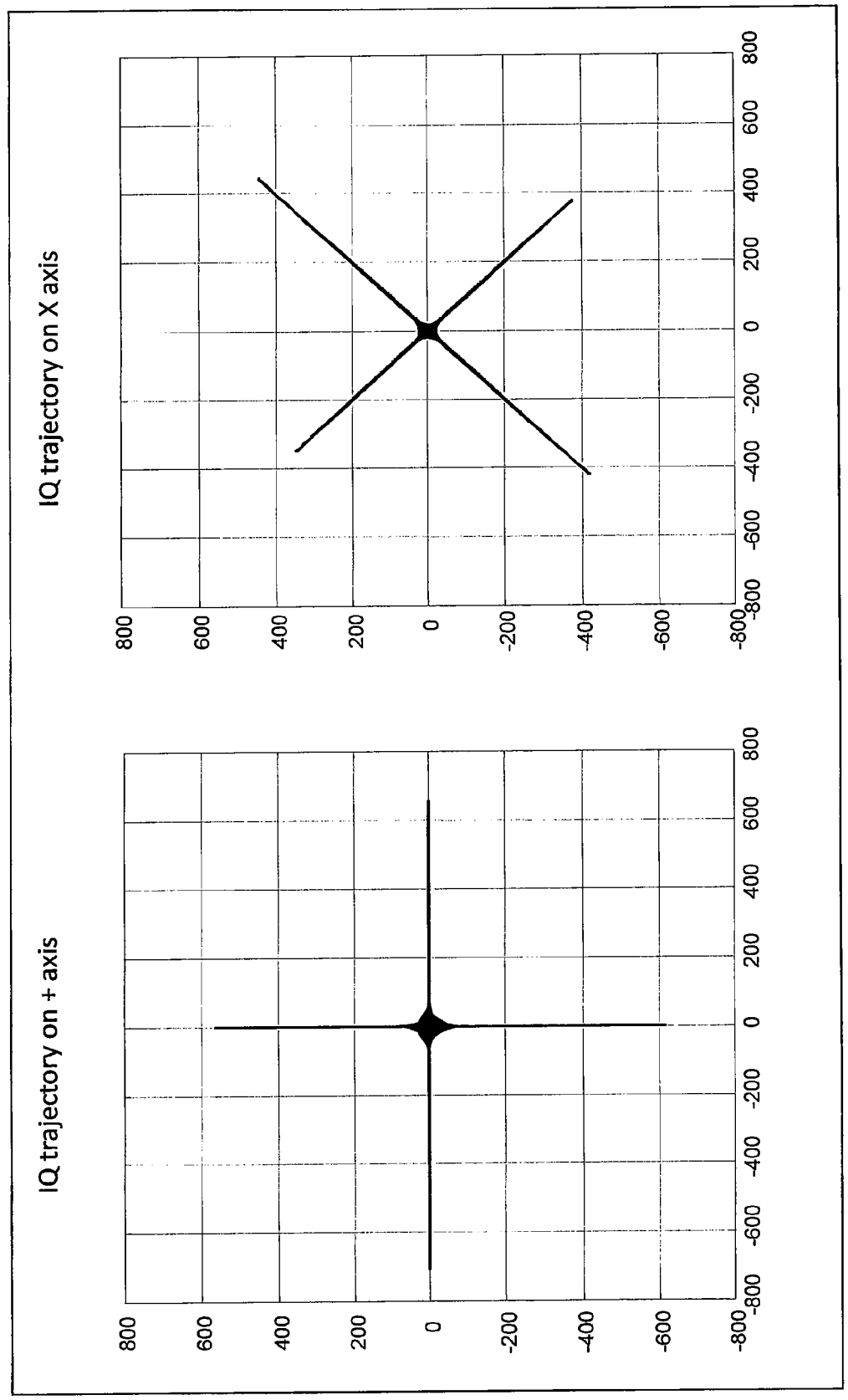
FIG. 15 is a diagram illustrating an example of signal processing of the transmitter according to the present invention.

FIG. 15 shows a trajectory which is obtained by representing, on the IQ plane, fluctuations of the Number and the phase for each of the (+ axis) and the (+ axis). The trajectory extends along axes of 0 and (π/2) or axes of (π/4) and (3π/4) when the phase fluctuates, and movement along the axes near the origin occurs, which indicates that the value of the Number is small. Therefore, even if time lag occurs in fluctuation of phase, a degree of error in signal can be reduced, and thus deterioration of quality of the transmission signal can be prevented, or timing requirement can be relaxed in designing of a transmission circuit.

Figure 16:
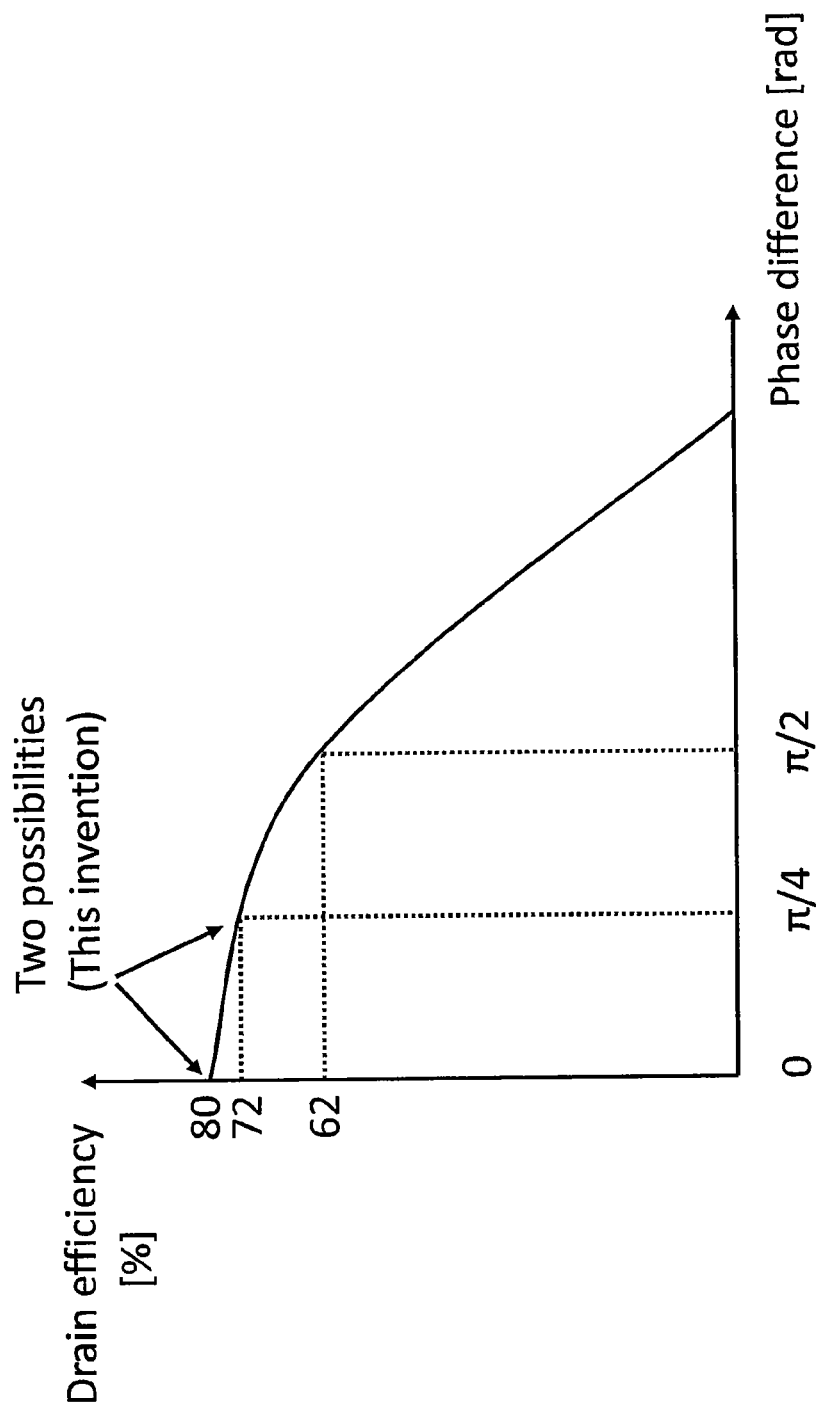
FIG. 16 is a diagram illustrating one of effects of the transmitter according to the present invention.
Figure 18:
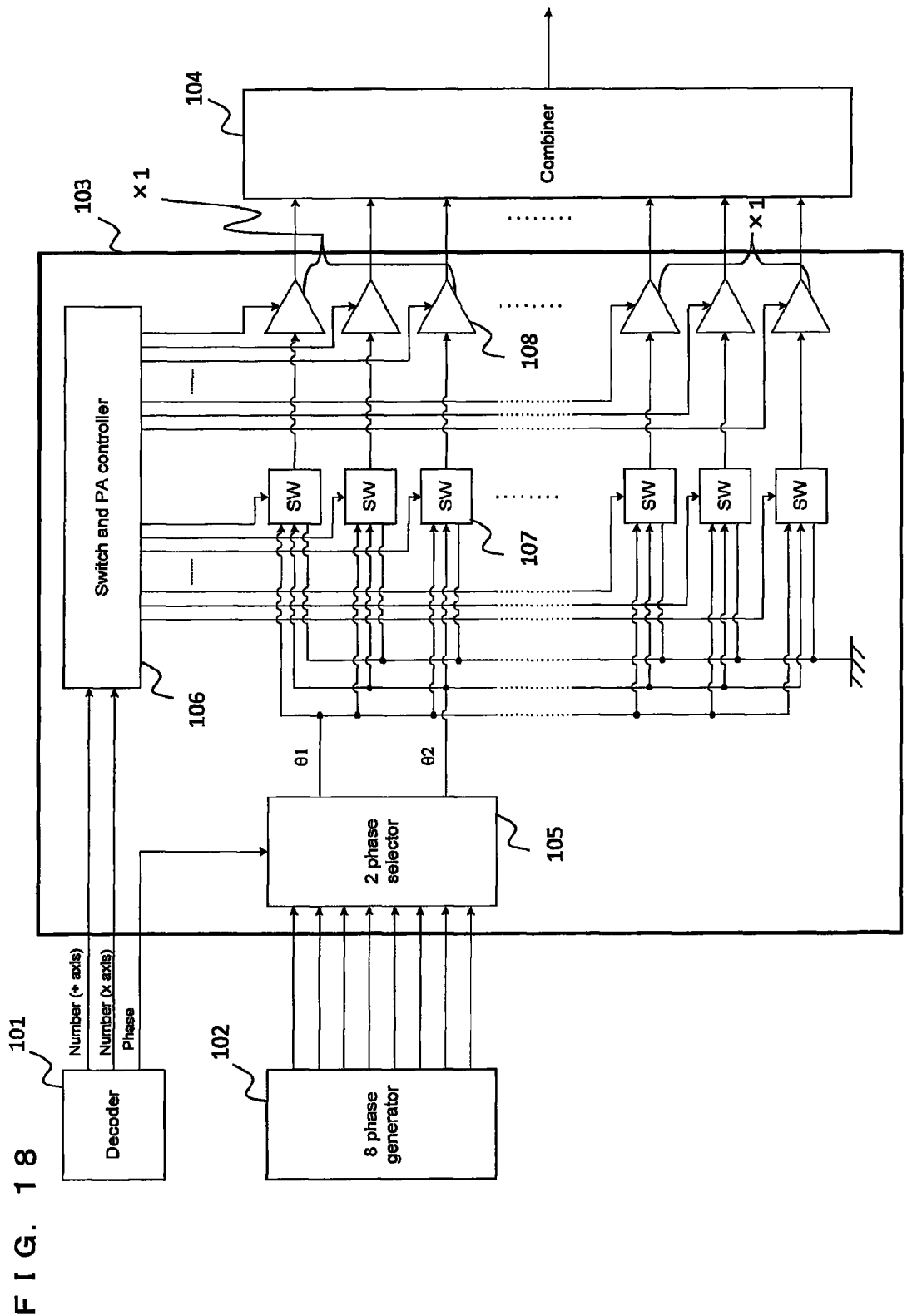
FIG. 18 is a diagram illustrating a configuration of a selector according to the third embodiment of the present invention.
Figure 19:
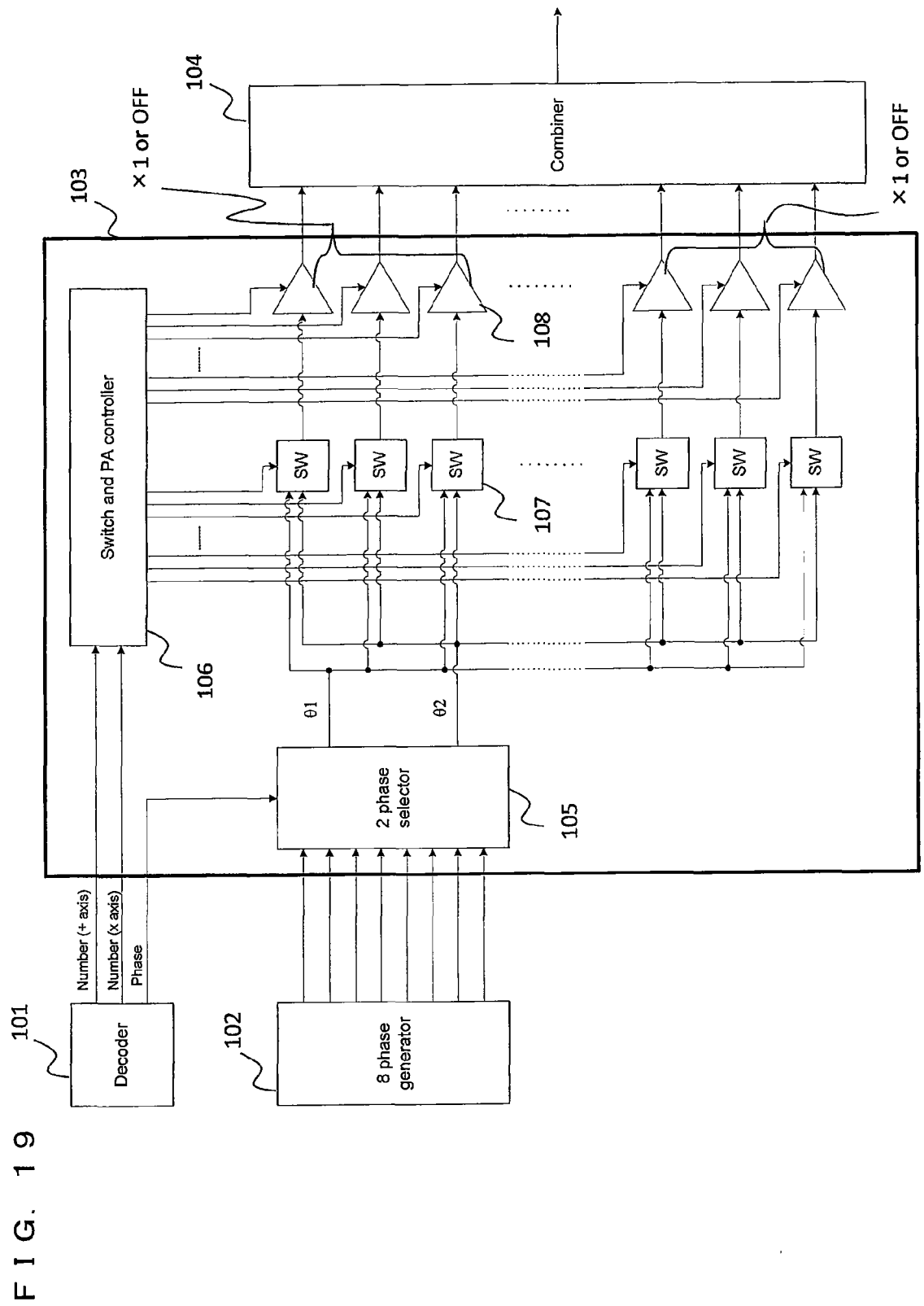
FIG. 19 is a diagram illustrating a configuration of a selector according to the third embodiment of the present invention.
Figure 20:
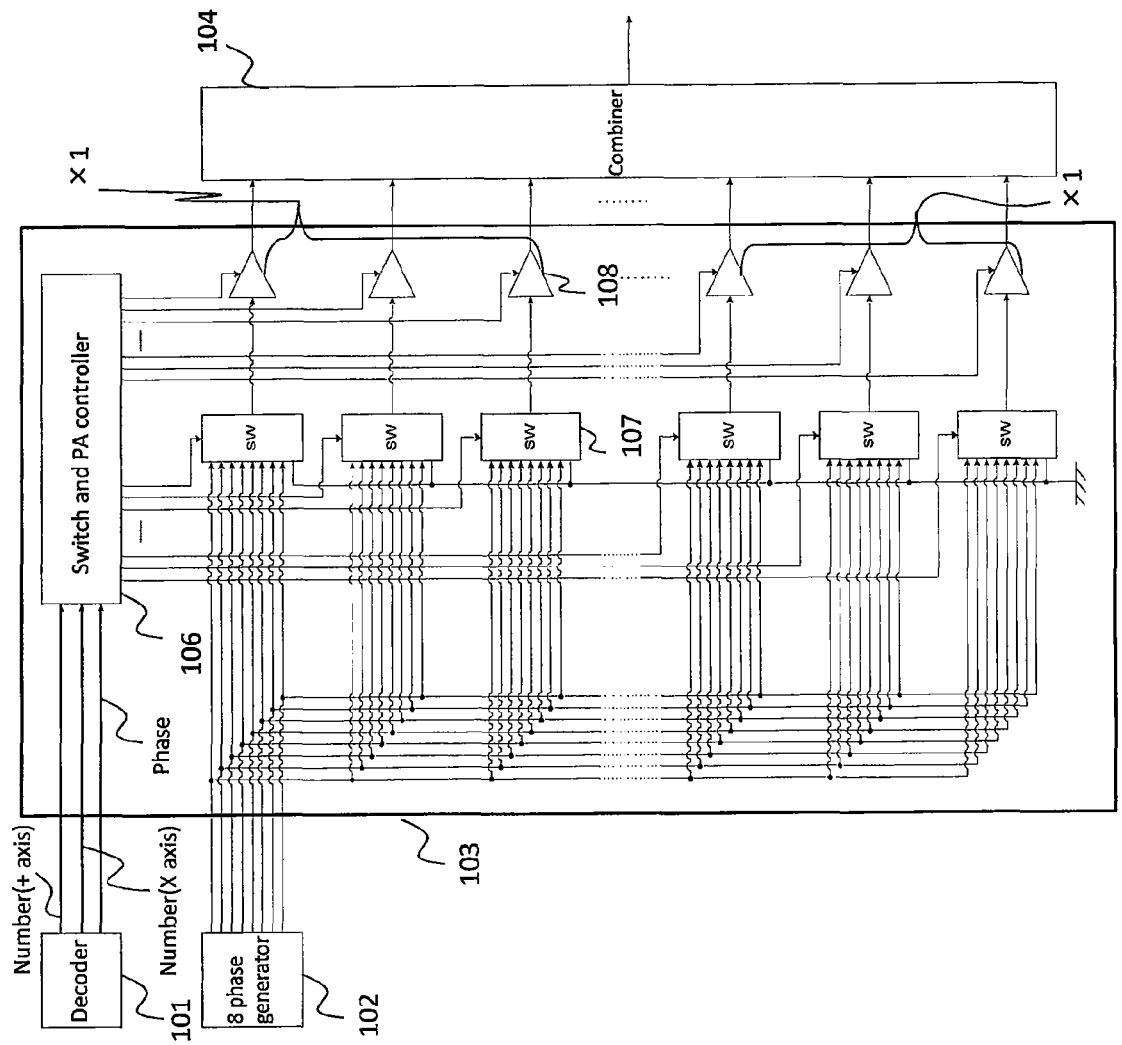
FIG. 20 is a diagram illustrating a configuration of a selector according to the third embodiment of the present invention.
Figure 21:
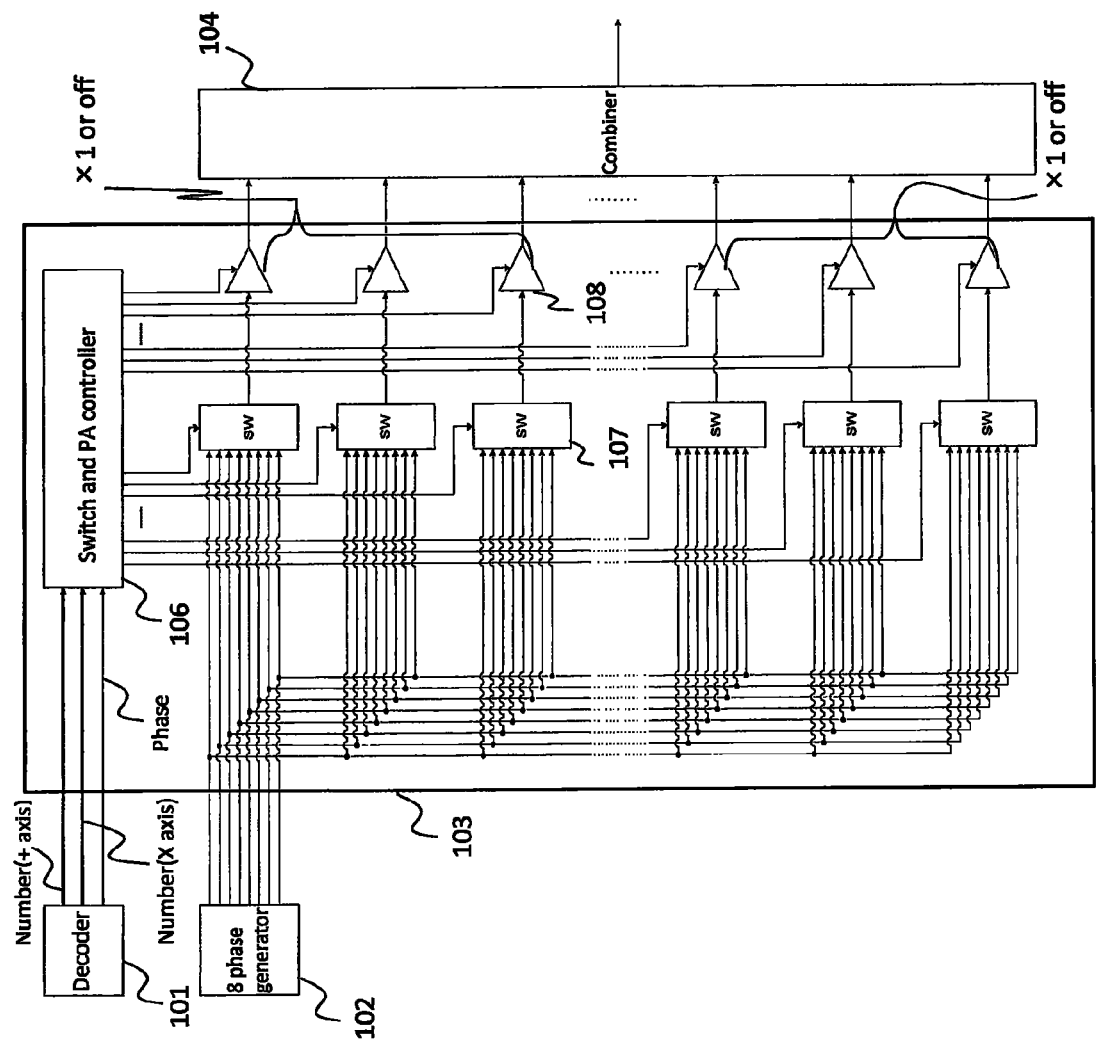
FIG. 21 is a diagram illustrating a configuration of a selector according to the third embodiment of the present invention.

In FIG. 16, the horizontal axis represents a phase difference between the PAs 108, and the vertical axis represents drain efficiency of the PAs 108, and influence of the phase difference on the drain efficiency is shown. In the transmitter according to the present invention, since the IQ signal is separated into two vectors forming an angle of (π/4), the phase difference is 0 or (π/4), and the drain efficiency of 72% to 80% is realized, thereby enhancing efficiency. On the other hand, in a case where, for example, the I signal and the Q signal are used without performing separation into two vectors, a phase difference of (π/2) occurs, thereby reducing the drain efficiency to 62%.

(Third Embodiment)

A transmitter 300 according to a third embodiment of the present invention will be described. In the present embodiment, a Number and a phase signal of the (+ axis), and a Number and a phase signal of the (X Axis) are obtained according to (equation 1), and outputted, similarly to the first and the second embodiments. However, the present embodiment is different from the first and the second embodiments in correspondence among values of the I signal, values of the Q signal, and output signals thereof, and positions of symbols represented on the IQ plane by the IQ signals. These are indicated in (a) and (b) of FIG. 17.

In FIG. 17(*b*), the unit length of the Number of the (+ axis) is 1, and the unit length of the (X Axis) is 1. On the other hand, in FIG. 3(*b*), the unit length of the Number of the (+ axis) is 1, and the unit length of the (X Axis) is sqrt (2).

Therefore, a relationship between the (+ axis) and the (X Axis) in FIG. 17(*b*) may be represented by the following equations when I≥0, Q≥0 is satisfied.

$$I + jQ = a_X\left(\frac{1+j}{\sqrt{2}}\right) + a_+ = \left(a_+ + \frac{a_X}{\sqrt{2}}\right) + j\frac{a_X}{\sqrt{2}} \quad \text{(Equation 2)}$$

Then, $$a_X = \sqrt{2}\, Q$$

$$a_+ = I - Q$$

In equations, $a_X$ represents the (+ axis), and $a_+$ represents the (+ axis). $a_X$ indicates a value which is obtained by multiplying the Number by 1/sqrt (2) since the unit length is 1/sqrt (2) times the unit length shown in FIG. 3(*b*). According to (equation 2), the Numbers of the (+ axis) shown in FIG. 17(*a*) each indicate a value which is √2 times a value shown in FIG. 3(*a*).

The transmitter 300 has a configuration similar to that of the transmitter 100. However, the transmitter 300 is different from the transmitter 100 in that the transmitter 300 performs a control such that a ratio, in an amplification unit of the amplification factor used by each of the PAs 108 for the inputted phase signal, between a phase signal of the (+ axis), i.e., 0, (π/2), (π), or (−π/2), and a phase signal of the (X axis), i.e., (π/4), (3π/4), −(π/4), or −(3π/4), is 1:1.

FIG. 18 to FIG. 21 each show in detail an exemplary configuration of the selector 103 of the transmitter 300. Although these configurations are the same as those of the selectors 103 shown in FIG. 4 to FIG. 7, each of the PAs 108 performs amplification using the same amplification unit.

Also in the present embodiment, the allocation is preferably performed such that the PAs 108 for a PA group for amplifying the phase signals of the (+ axis) are selected in an order starting from one end side of an alignment of the plurality of PAs 108, and the PAs 108 for a PA group for amplifying the phase signals of the (X axis) are selected in an order starting from the other end side of the alignment of the plurality of PAs 108. Thus, a distance between the PAs 108 belonging to different groups can be increased, thereby enabling improvement of isolation and improvement of a quality of a transmission signal.

Further, also in the present embodiment, as in the second embodiment, the predistorter 150 may be provided.

(Fourth Embodiment)

A fourth embodiment of the present invention will be described. In the third embodiment, the IQ plane is divided into eight regions according to (equation 1). However, in the present embodiment, the IQ signal is separated into two vectors according to (equation 3) described below. Two phase signals are selected from among 4N phase signals, and the two phase signals are amplified based on coefficients A and B, to obtain an output signal.

$$I + jQ = A\exp\left(j(n-1)\frac{\pi}{2N}\right) + B\exp\left(jn\frac{\pi}{2N}\right) \quad \text{(Equation 3)}$$

$$\left(A \text{ and } B \text{ each represent a non-negative value,}\right.$$

$$n \text{ is a natural number which satisfies } (n-1)\frac{\pi}{2N} \le$$

$$\left.\arg(I + jQ) < n\frac{\pi}{2N}\right)$$

Figure 22:
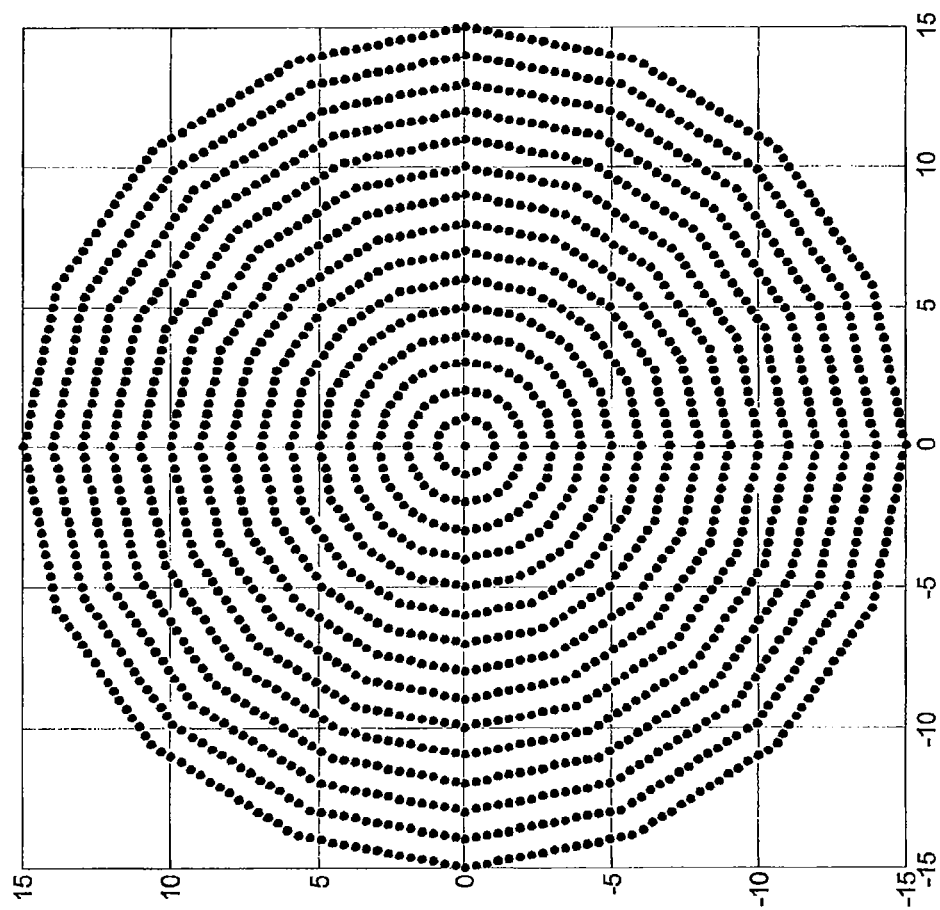
FIG. 22 is a diagram illustrating examples of a signal pattern and signal processing according to a fourth embodiment of the present invention.

FIG. 22 shows exemplary positions of symbols represented on the IQ plane by the IQ signals in the case of N=4 being satisfied. Each symbol is determined by using, for example, coefficients A and B for minimizing quantization noise.

The present embodiment corresponds to generalization of the first and the third embodiments. Components for the present embodiment are the same as those for the first embodiment. However, the present embodiment is different from the first embodiment in that: the decoder 101 transforms the IQ signal into information upon the magnitudes and the angles of the two vectors represented by the right-hand side of (equation 3), and outputs the information; the phase generator 102 generates and outputs 4N phase signals having phases, respectively, obtained by dividing the angle 2π into 4N (N is an integer greater than or equal to 2) equal angles; and the selector 103 selects phase signals having the same angles as the two vectors represented by the right-hand side of (equation 3), from among the 4N phase signals outputted by the phase generator 102, based on the information upon the magnitudes and the angles which is outputted by the decoder 101, amplifies the selected phase signals, and outputs resultant signals, in the present embodiment. The selector may have the same configuration as shown in any of FIGS. 4 to 7, and FIGS. 18 to 21, and the amplification unit of the amplification factor in the PAs 108 may be set as necessary.

The transmitter of the present invention may be connected to an antenna and a receiver via an antenna switch, to configure a wireless transmission and reception device. Further, the transmitter of the present invention and the wireless transmission and reception device including the transmitter are applicable to, for example, mobile telephones, and communication apparatuses for wireless LANs.

While the invention has been described in detail, the foregoing description is in all aspects illustrative and not restrictive. It will be understood that numerous other modifications and variations can be devised without departing from the scope of the invention.

Further, in the embodiments described above, an exemplary case is described in which the present invention is implemented as hardware. However, the present invention may be implemented as software in conjunction with hardware.

The invention claimed is:

1. A transmitter for receiving an IQ signal, and outputting a transmission signal, the transmitter comprising:
a decoder for transforming the IQ signal into a linear sum of two vectors which have non-negative coefficients, respectively, which form an angle of (π/4), and which are included in eight vectors representing directions indicated by eight angels of (−π/2), 0, (π/2), π, (−3π/4), (−π/4), (π/4), and (3π/4), respectively, and for outputting information upon magnitudes and angles of the two vectors;

a phase generator for generating eight phase signals corresponding to phases of (−π/2), 0, (π/2), π, (−3π/4), (−π/4), (π/4), and (3π/4), respectively, and outputting the eight phase signals;

a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal, wherein the selector includes:
a switch and PA (power amplifier) controller;
a 2 phase selector;
a plurality of switches; and
a plurality of PAs that are uniquely connected to the plurality of switches, respectively,
the 2 phase selector selects two phase signals having phases equivalent to angles of the two vectors, from among the eight phase signals, based on the information upon the angles of the two vectors, and
based on information upon magnitudes of the two vectors, the switch and PA controller controls each of the plurality of switches so as to select either an off state or one of the two phase signals selected by the 2 phase selector, and
controls, when one of the plurality of switches is operated to select one of the two phase signals, a PA, among the plurality of PAs, connected to the one of the plurality of switches, so as to amplify the one of the two phase signals by using a predetermined amplification unit.

2. The transmitter according to claim 1, wherein the switch and PA controller controls the plurality of PAs such that an amplification unit used when any of the plurality of PAs amplifies a phase signal having one of phases of (−3π/4), (−π/4), (π/4), and (3π/4) among the eight phase signals is sqrt (2) times an amplification unit used when any of the plurality of PAs amplifies a phase signal having one of phases of (−π/2), 0, (π/2), and π among the eight phase signals.

3. The transmitter according to claim 1, wherein the switch and PA controller controls the plurality of PAs such that amplification units used by any of the plurality of PAs for amplifying the eight phase signals are the same among the eight phase signals.

4. The transmitter according to claim 1, wherein
the plurality of PAs are aligned in line, and
the switch and PA controller
sequentially selects, from among the plurality of PAs, at least one PA for amplifying one of the two phase signals selected by the 2 phase selector, in an order starting from one end of the line in which the plurality of PAs are aligned, and sequentially selects at least one PA for amplifying the other of the two phase signals, in an order starting from the other end of the line in which the plurality of PAs are aligned.

5. A transmitter for receiving an IQ signal, and outputting a transmission signal, the transmitter comprising:
a decoder for transforming the IQ signal into a linear sum of two vectors which have non-negative coefficients, respectively, which form an angle of (π/4), and which are included in eight vectors representing directions indicated by eight angels of (−π/2), 0, (π/2), π, (−3π/4), (−π/4), (π/4), and (3π/4), respectively, and for outputting information upon magnitudes and angles of the two vectors;

a phase generator for generating eight phase signals corresponding to phases of (−π/2), 0, (π/2), π, (−3π/4), (−π/4), (π/4), and (3π/4), respectively, and outputting the eight phase signals;

a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal, wherein the selector includes:
a switch and PA (power amplifier) controller;
a 2 phase selector;
a plurality of switches; and
a plurality of PAs that are uniquely connected to the plurality of switches, respectively,
the 2 phase selector selects two phase signals having phases equivalent to angles of the two vectors, from among the eight phase signals, based on the information upon the angles of the two vectors, and
based on information upon magnitudes of the two vectors, the switch and PA controller
controls each of the plurality of switches so as to select one of the two phase signals selected by the 2 phase selector, and
controls whether each of the plurality of PAs is to be on or off, and controls, among the plurality of PAs, a PA that is on, so as to amplify, by using a predetermined amplification unit, one of the two phase signals selected by one of the plurality of switches, which is connected to the PA.

6. The transmitter according to claim 5, wherein the switch and PA controller controls the plurality of PAs such that an amplification unit used when any of the plurality of PAs amplifies a phase signal having one of phases of (−3π/4), (−π/4), (π/4), and (3π/4) among the eight phase signals is sqrt (2) times an amplification unit used when any of the plurality of PAs amplifies a phase signal having one of phases of (−π/2), 0, (π/2), and π among the eight phase signals.

7. A transmitter for receiving an IQ signal, and outputting a transmission signal, the transmitter comprising:
a decoder for transforming the IQ signal into a linear sum of two vectors which have non-negative coefficients, respectively, which form an angle of (π/4), and which are included in eight vectors representing directions indicated by eight angels of (−π/2), 0, (π/2), π, (−3π/4), (−π/4), (π/4), and (3π/4), respectively, and for outputting information upon magnitudes and angles of the two vectors;

a phase generator for generating eight phase signals corresponding to phases of (−π/2), 0, (π/2), π, (−3π/4), (−π/4), (π/4), and (3π/4), respectively, and outputting the eight phase signals;

a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal, wherein the selector includes:

a switch and PA (power amplifier) controller;

a plurality of switches; and a plurality of PAs that are uniquely connected to the plurality of switches, respectively, and based on the information upon the magnitudes and the angles of the two vectors, the switch and PA controller controls each of the plurality of switches so as to select either an off state or one of the two phase signals which have phases equivalent to the angles of the two vectors, and which are among the eight phase signals, and controls, when one of the plurality of switches is operated to select one of the two phase signals, a PA, among the plurality of PAs, connected to the one of the plurality of switches, so as to amplify the one of the two phase signals by using a predetermined amplification unit.

8. The transmitter according to claim 7, wherein the switch and PA controller controls the plurality of PAs such that an amplification unit used when any of the plurality of PAs amplifies a phase signal having one of phases of $(-3\pi/4)$, $(-\pi/4)$, $(\pi/4)$, and $(3\pi/4)$ among the eight phase signals is sqrt (2) times an amplification unit used when any of the plurality of PAs amplifies a phase signal having one of phases of $(-\pi/2)$, 0, $(\pi/2)$, and $\pi$ among the eight phase signals.

9. A transmitter for receiving an IQ signal, and outputting a transmission signal, the transmitter comprising:

a decoder for transforming the IQ signal into a linear sum of two vectors which have non-negative coefficients, respectively, which form an angle of $(\pi/4)$, and which are included in eight vectors representing directions indicated by eight angels of $(-\pi/2)$, 0, $(\pi/2)$, $\pi$, $(-3\pi/4)$, $(-\pi/4)$, $(\pi/4)$, and $(3\pi/4)$, respectively, and for outputting information upon magnitudes and angles of the two vectors;

a phase generator for generating eight phase signals corresponding to phases of $(-\pi/2)$, 0, $(\pi/2)$, $\pi$, $(-3\pi/4)$, $(-\pi/4)$, $(\pi/4)$, and $(3\pi/4)$, respectively, and outputting the eight phase signals;

a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal, wherein the selector includes:

a switch and PA (power amplifier) controller;

a plurality of switches; and a plurality of PAs that are uniquely connected to the plurality of switches, respectively, and based on the information upon the magnitudes and the angles of the two vectors, the switch and PA controller controls each of the plurality of switches so as to select, from among the eight phase signals, one of the two phase signals having phases equivalent to the angles of the two vectors, and controls whether each of the plurality of PAs is to be on or off, and controls, among the plurality of PAs, a PA that is on, so as to amplify, by using a predetermined amplification unit, one of the two phase signals selected by one of the plurality of switches, which is connected to the PA.

10. The transmitter according to claim 9, wherein the switch and PA controller controls the plurality of PAs such that an amplification unit used when any of the plurality of PAs amplifies a phase signal having one of phases of $(-3\pi/4)$, $(-\pi/4)$, $(\pi/4)$, and $(3\pi/4)$ among the eight phase signals is sqrt (2) times an amplification unit used when any of the plurality of PAs amplifies a phase signal having one of phases of $(-\pi/2)$, 0, $(\pi/2)$, and $\pi$ among the eight phase signals.

11. A transmitter for receiving an IQ signal, and outputting a transmission signal, the transmitter comprising:

a decoder for transforming the IQ signal into a linear sum of two vectors which have non-negative coefficients, respectively, which form an angle of $(\pi/4)$, and which are included in eight vectors representing directions indicated by eight angels of $(-\pi/2)$, 0, $(\pi/2)$, $\pi$, $(-3\pi/4)$, $(-\pi/4)$, $(\pi/4)$, and $(3\pi/4)$, respectively, and for outputting information upon magnitudes and angles of the two vectors;

a phase generator for generating eight phase signals corresponding to phases of $(-\pi/2)$, 0, $(\pi/2)$, $\pi$, $(-3\pi/4)$, $(-\pi/4)$, $(\pi/4)$, and $(3\pi/4)$, respectively, and outputting the eight phase signals;

a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and a combiner for combining the plurality of amplification signals with each other, and outputting a combined signal as the transmission signal, wherein the selector includes:

a switch and PA (power amplifier) controller;

a 2 phase selector;

a first switch group including a plurality of switches, and a second switch group including a plurality of switches;

a first PA group including a plurality of PAs that are uniquely connected to the plurality of switches, respectively, of the first switch group; and a second PA group including a plurality of PAs that are uniquely connected to the plurality of switches, respectively, of the second switch group, and based on the information upon the magnitudes and the angles of the two vectors, the switch and PA controller controls the 2 phase selector so as to select, from among the eight phase signals, two phase signals having phases equivalent to the angles of the two vectors, controls each of the plurality of switches of the first switch group so as to select either an off state or a phase signal which has a phase equivalent to one of $(-\pi/2)$, 0, $(\pi/2)$, and $\pi$, and which is among the two phase signals selected by the 2 phase selector, controls, when one of the plurality of switches of the first switch group is operated to select the phase signal, a PA, among the plurality of PAs of the first PA group, connected to the one of the plurality of switches of the first switch group, so as to amplify the phase signal by using a first predetermined amplification unit, controls each of the plurality of switches of the second switch group so as to select either an off state or a phase signal which has a phase equivalent to one of $(-3\pi/4)$, $(-\pi/4)$, $(\pi/4)$, and $(3\pi/4)$, and which is among the two phase signals selected by the 2 phase selector, and controls, when one of the plurality of switches of the second switch group is operated to select the phase signal, a PA, among the plurality of PAs of the second PA group, connected to the one of the plurality of switches of the second switch group, so as to amplify the phase signal by using a second predetermined amplification unit that is sqrt (2) times the first predetermined amplification unit.

12. The transmitter according to claim 11, wherein the switch and PA controller controls the plurality of PAs such that an amplification unit used when any of the plurality of PAs amplifies a phase signal having one of phases of $(-3\pi/4)$, $(-\pi/4)$, $(\pi/4)$, and $(3\pi/4)$ among the eight phase signals is sqrt (2) times an amplification unit used when any of the plurality of PAs amplifies a phase signal having one of phases of $(-\pi/2)$, $0$, $(\pi/2)$, and $\pi$ among the eight phase signals.

13. A transmitter for receiving an IQ signal, and outputting a transmission signal, the transmitter comprising:
- a decoder for transforming the IQ signal into a linear sum of two vectors which have non-negative coefficients, respectively, which form an angle of $(\pi/4)$, and which are included in eight vectors representing directions indicated by eight angels of $(-\pi/2)$, $0$, $(\pi/2)$, $\pi$, $(-3\pi/4)$, $(-\pi/4)$, $(\pi/4)$, and $(3\pi/4)$, respectively, and for outputting information upon magnitudes and angles of the two vectors;
- a phase generator for generating eight phase signals corresponding to phases of $(-\pi/2)$, $0$, $(\pi/2)$, $\pi$, $(-3\pi/4)$, $(-\pi/4)$, $(\pi/4)$, and $(3\pi/4)$, respectively, and outputting the eight phase signals;
- a selector for selecting two phase signals having phases equivalent to angles of the two vectors, from among the eight phase signals, and amplifying the two phase signals having been selected, based on the information upon the magnitudes and the angles of the two vectors, and outputting, as a plurality of amplification signals, the two phase signals having been amplified; and
- a combiner for combining the plurality of amplification signals with each other, and outputting a combined signal as the transmission signal,
- a predistorter for subjecting the IQ signal to distortion compensation, wherein
the IQ signal having been subjected to the distortion compensation is inputted to the decoder,
the predistorter includes:
- a predistorter decoder for transforming the IQ signal into a linear sum of two vectors which have non-negative coefficients, respectively, which form an angle of $(4/\pi)$, and which are included in eight vectors representing directions indicated by eight angles of $(-\pi/2)$, $0$, $(\pi/2)$, $\pi$, $(-3\pi/4)$, $(-\pi/4)$, $(\pi/4)$, and $(3\pi/4)$, respectively, and for outputting information upon magnitudes and angels of the two vectors;
- a first look-up table (LUT) for outputting a first compensation vector that corresponds to a phase signal of a first predetermined angle, and that is based on a magnitude of a first vector, among the two vectors, having one of directions represented by at least $(-\pi/2)$, $0$, $(\pi/2)$, and $\pi$;
- a first rotation calculator for rotating the first compensation vector, based on an angle of the first vector, in accordance with a difference between the first vector and the first predetermined angle, and outputting the first compensation vector having been rotated;
- a second look-up table (LUT) for outputting a second compensation vector that corresponds to a phase signal of a second predetermined angle, and that is based on a magnitude of a second vector, among the two vectors, having one of directions represented by at least $(-3\pi/4)$, $(-\pi/4)$, $(\pi/4)$, and $(3\pi/4)$;
- a second rotation calculator for rotating the second compensation vector, based on an angle of the second vector, in accordance with a difference between the angle of the second vector and the second predetermined angle, and outputting the second compensation vector having been rotated;
- a first adder for adding an output of the first rotation calculator and an output of the second rotation calculator, and outputting a resultant output; and
- a second adder for adding the output of the first adder to an original IQ signal, and outputting a resultant output.

14. The transmitter according to claim 13, wherein the first LUT and the second LUT output the first compensation vector and the second compensation vector, respectively, based on the magnitudes of both of the two vectors.

15. The transmitter according to claim 13, wherein
the first LUT outputs the first compensation vector in forms of an amplitude component and a phase component, and the second LUT outputs the second compensation vector in forms of an amplitude component and a phase component, and
the predistorter further includes a first IQ transformer and a second IQ transformer for transforming the first compensation vector and the second compensation vector into IQ signals, and inputting the IQ signals to the first rotation calculator and the second rotation calculator, respectively.

* * * * *